United States Patent
Burger

[19]

[11] Patent Number: 6,124,974
[45] Date of Patent: Sep. 26, 2000

[54] LENSLET ARRAY SYSTEMS AND METHODS

[75] Inventor: Robert J. Burger, Newton, Mass.

[73] Assignee: Proxemics, Newton Centre, Mass.

[21] Appl. No.: 09/276,896

[22] Filed: Mar. 25, 1999

Related U.S. Application Data

[63] Continuation-in-part of application No. 08/786,752, Jan. 24, 1997, Pat. No. 5,973,844
[60] Provisional application No. 60/010,670, Jan. 26, 1996.

[51] Int. Cl.[7] .................................................. G02B 27/10
[52] U.S. Cl. ............................................................ 359/621
[58] Field of Search .................................... 359/619, 621, 359/622, 624, 625, 626

[56] References Cited

U.S. PATENT DOCUMENTS

| 3,357,770 | 12/1967 | Clay | 359/626 |
|---|---|---|---|
| 3,522,424 | 8/1970 | Fritsch | 359/619 |

(List continued on next page.)

OTHER PUBLICATIONS

Stone et al. "Hybrid diffractive–refractive lenses and achromats", *Applied Optics*, vol. 27, No. 14, Jul. 1988, pp. 2960–2971.

Popovic et al. "Technique for monolithic fabrication of microlens arrays", *Applied Optics*, vol. 27, No. 7, Apr. 1988, pp. 1281–1284.

Jahns et al. "Two–dimensional array of diffractive microlenses fabricated by thin film deposition", *Applied Optics*, vol. 29, N0 7, Mar. 1990, pp. 931–936.

Dammann et al. "High–efficiency in–line imaging by means of multiple phase holograms", *Optics Communications*, vol. 3, No. 5, Jul. 1971 pp. 312–315.

Walker et al. "Array generation with multilevel phase gratings", *J. Opt. Soc. Am. A.*, vol. 7, No. 8, Aug. 1990, pp. 1509–1513.

Fukushima et al. "A light–emitting tube array for giant colour display", *Displays*, Oct. 1983, pp. 207–211.

Iga et al. "Stacked planar optics: an application of the planar microlens", *Applied Optics*, vol. 21, No. 19, Oct. 1982, pp. 3456–3460.

Prongue et al. "Optimized kinoform structure for highly efficient fan–out elements", *Appllied Optics*, vol. 31, No. 26, Sep. 1992, pp. 5706–5711.

(List continued on next page.)

*Primary Examiner*—Ricky Mack
*Attorney, Agent, or Firm*—Duft, Graziano & Forest, PC

[57] ABSTRACT

A stacked array magnifier (SAM) forms a magnified, demagnified or unit image of an object. The SAM includes one or more non-refractive lenslet arrays and one or more refractive lenslet arrays to form a plurality of lenslet channels. Each lenslet channel has at least one refractive lenslet and at least one non-refractive lenslet. SAMs are combined and tiled to form a scaleable display of flat panel displays. Multiple SAMs are used to increase magnification selectively. Hybrid lenslet arrays of the invention are also useable for optical processing and non-imaging applications.

27 Claims, 22 Drawing Sheets

U.S. PATENT DOCUMENTS

| | | | |
|---|---|---|---|
| 3,605,593 | 9/1971 | Ohki | 428/409 |
| 4,082,415 | 4/1978 | Brooks et al. | 359/20 |
| 4,114,037 | 9/1978 | Westwood | 250/216 |
| 4,168,900 | 9/1979 | Adachi | 355/1 |
| 4,331,380 | 5/1982 | Rees et al. | 385/116 |
| 4,448,499 | 5/1984 | Tokumaru | 359/619 |
| 4,462,662 | 7/1984 | Lama | 359/653 |
| 4,474,459 | 10/1984 | Tokumura | 355/46 |
| 4,512,641 | 4/1985 | Mochizuki et al. | 359/619 |
| 4,588,261 | 5/1986 | Erhardt | 257/432 |
| 4,632,522 | 12/1986 | Ishitani | 359/432 |
| 4,682,239 | 7/1987 | Watanabe | 348/383 |
| 4,692,015 | 9/1987 | Loce et al. | 355/1 |
| 4,715,027 | 12/1987 | Mahapatra et al. | 359/130 |
| 4,733,096 | 3/1988 | Horiguchi | 358/482 |
| 4,807,978 | 2/1989 | Grinberg | 359/20 |
| 4,824,192 | 4/1989 | Roberts | 359/22 |
| 4,833,542 | 5/1989 | Hara et al. | 348/383 |
| 4,836,652 | 6/1989 | Oishi et al. | 359/40 |
| 4,846,552 | 7/1989 | Veldkamp et al. | 359/572 |
| 4,895,790 | 1/1990 | Swanson et al. | 430/321 |
| 4,924,318 | 5/1990 | Ho | 348/383 |
| 4,946,253 | 8/1990 | Kostuck | 359/15 |
| 4,970,403 | 11/1990 | Krasutsky | 250/216 |
| 5,035,486 | 7/1991 | Inokuchi | 359/625 |
| 5,052,783 | 10/1991 | Hamada | 359/40 |
| 5,056,912 | 10/1991 | Hamada et al. | 353/38 |
| 5,059,008 | 10/1991 | Flood et al. | 359/196 |
| 5,071,232 | 12/1991 | Kato et al. | 359/315 |
| 5,113,286 | 5/1992 | Morrison | 359/569 |
| 5,187,599 | 2/1993 | Nakanishi et al. | 359/41 |
| 5,235,661 | 8/1993 | Kawai | 385/129 |
| 5,250,798 | 10/1993 | Ikzuka et al. | 250/208.1 |
| 5,270,859 | 12/1993 | Wirth et al. | 359/622 |
| 5,276,538 | 1/1994 | Monji et al. | 359/40 |
| 5,315,330 | 5/1994 | Hamada | 353/31 |
| 5,337,186 | 8/1994 | Oikawa et al. | 359/628 |
| 5,351,151 | 9/1994 | Levy | 359/240 |
| 5,398,125 | 3/1995 | Willett et al. | 359/41 |
| 5,401,968 | 3/1995 | Cox | 250/353 |
| 5,412,506 | 5/1995 | Fedblum et al. | 359/569 |
| 5,463,498 | 10/1995 | Gal et al. | 359/622 |
| 5,517,279 | 5/1996 | Hugle et al. | 355/46 |

OTHER PUBLICATIONS

Herzig et al. "Fan–out elements recorded as volume holograms: optimized recording conditions", *Applied Optics*, vol. 31, No. 26, Sep. 1992, pp. 5716–5723.

Wang et al. "Two–dimensional optical wavelet transform in space domain and its performance analysis", *Applied Optics*, vol. 33, No. 23, Aug. 1994, pp. 5271–5274.

Hamanaka et al. "Multiple imaging and multiple Fourier transformation using planar microlens array", *Applied Optics*, vol. 29, No. 28, Oct. 1990, pp. 4064–4070.

Akiba et al. "Image multiplexer using a planar microlens arrays", *Applied Optics*, vol. 29, No. 28, Oct. 1990, pp. 4092–4097.

Araki "Compound eye systems for nonunity magnification projection", *Applied Optics*, vol. 29, No. 28, Oct. 1990, pp. 4098–4104.

Shiono et al. "Rectangular–apertured micro–Fresnel lens arrays fabricated by electron–beam lithography", *Applied Optics*, vol. 26, No. 3, pp. 587–591.

Takanori "Three dimensional imaging techniques", *Academic Press*, NY 1976, pp. 21, 22, 131, 132.

Ishihara "A High photosensitivity IL–CCD image with monolithic resin lens array", *IEEE*, IEDM–83, Dec. 1983, Nos. 5, 6, 7, pp. 497–500.

Oikawa et al. "Integrated Planar Microlens and its applications" *SPIE*, vol. 898, Jan. 1988, pp. 3–11.

Goltsos et al. "Minary micro potics: an application to beam steering", *SPIE*, vol. 1052, Jan. 1989, pp. 131–141.

Kobolla et al. "Holographic tandem arrays", *SPIE*, vol. 1136, 1989, pp. 146–149.

Herzig et al. "Design and fabrication of diffractive optical elements for beam shaping and imaging", *SPIE*, vol. 1718, 1992, pp. 130–139.

Buralli et al. "A flat–field diffractive landscape lens: design and performance", *SPIE*, vol. 1136, 1989, pp. 134–139.

Lee Diffractive Optics and computer generated holograms for optical interconnects:, *Critical Review*, vol. Cr–49, 1983, pp. 291–301.

Walker et al. "Construction of a matrix–matrix crossbar optical interconnect employing diffractive fan–out and fan–in elements", *SPIE*, 1993, pp. 31–34.

Kuhlow et al. "Two–dimensional arrays of diffractive microlenses for optical interconnects" *SPIE*, 1993, pp. 41–46.

Kathman et al. "Binary optics: new diffractive elements for the designer's tool kit", *Photonics Spectra*, Binary Optics, Sep. 1992.

Gao et al. "Goaxial architecture of an optical neural network with a lenslet array", *Optics Letters*, vol. 19, No. 24, Dec. 1994, pp. 2155–2157.

Sauer et al. "Refractive–diffractive micro–optics for permutation interconnects", *Optical Engineering*, vol. 33, No. 5. May 1994, pp. 1550–1560.

Matsushita et al. "Optical symbolic substitution using lenslet arrays", *Optical Engineering*, vol. 32, No. 4, Apr. 1993, pp. 847–851.

Veldkamp et al. "High efficiency binary lenses", *Optics Communications*, vol. 53, No. 6, Apr. 1985, pp. 353–358.

Buralli et al. "Optical performance of holographic kinoforms", *Applied Optics*, vol. 28, No. 5, Mar. 1989, pp. 976–983.

Brown et al. "Techniques for designing hybrid diffractive optical elements", *SPIE*, vol. 1527, Jul. 1991.

Swanson "Binary optics technology: the theory and design of multi–level diffractive optical elements", *Massachusetts Institute of Technology Lincoln Laboratory, Technical Report 854*, Aug. 1989, pp. 1–49.

Harrison et al. "Large area focal place comprising charge––coupled devices and fiber optics" *Optical Engineering*, vol. 26, No. 9, Sep. 1987, pp. 897–901.

Stern "Fabricating binary optics in infrared and visible materials", *SPIE*, vol. 1751, 1992, pp. 85–95.

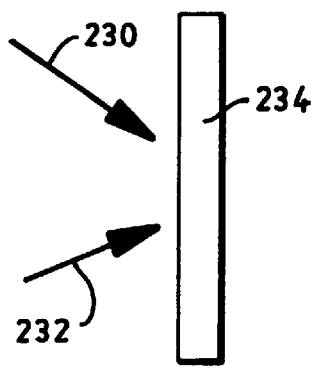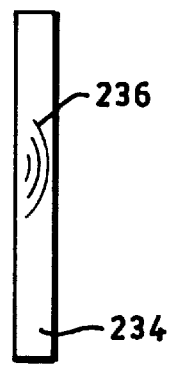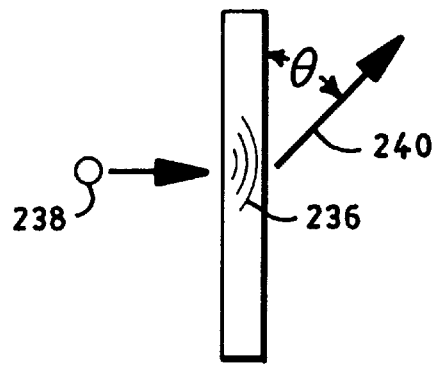
FIG. 10A      FIG. 10B      FIG. 10C
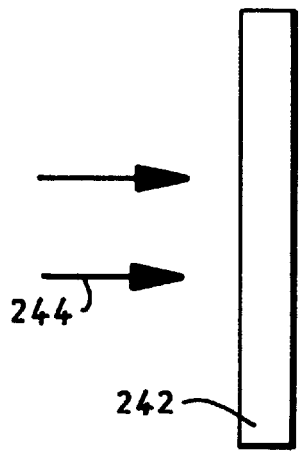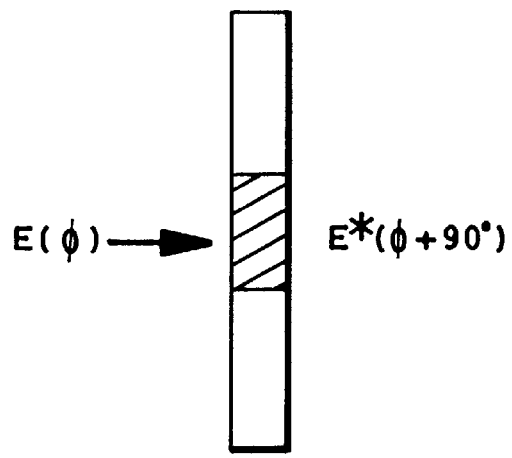
FIG. 11A      FIG. 11B

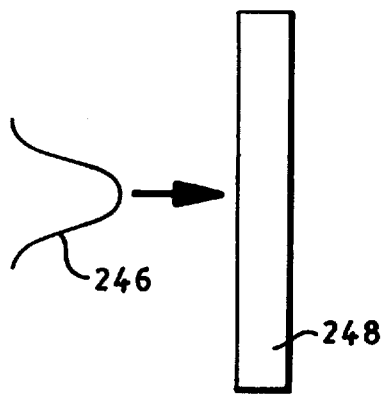 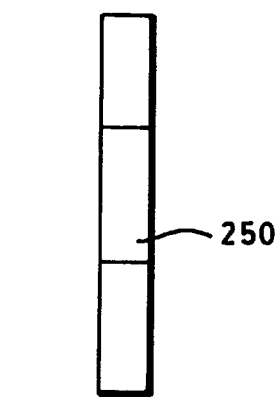 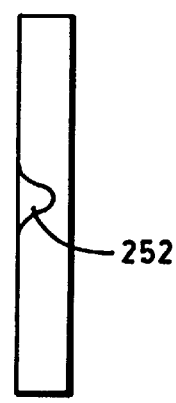
FIG. 12A  FIG. 12B  FIG. 12C
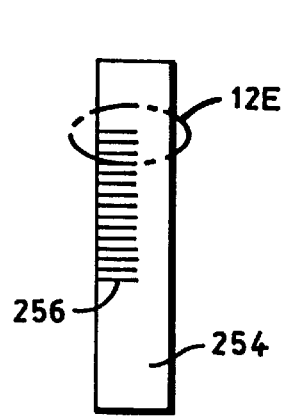 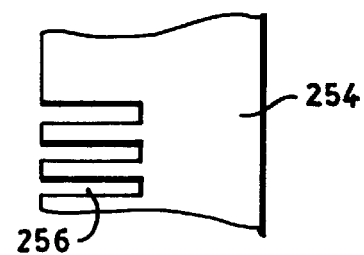
FIG. 12D  FIG. 12E

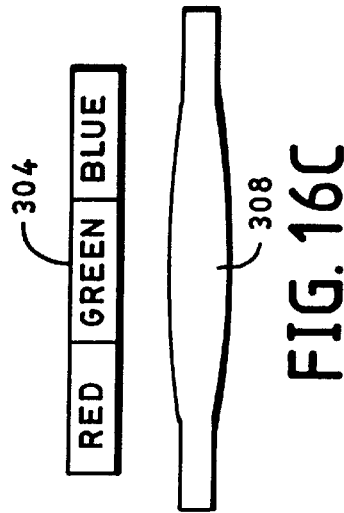
FIG. 16A
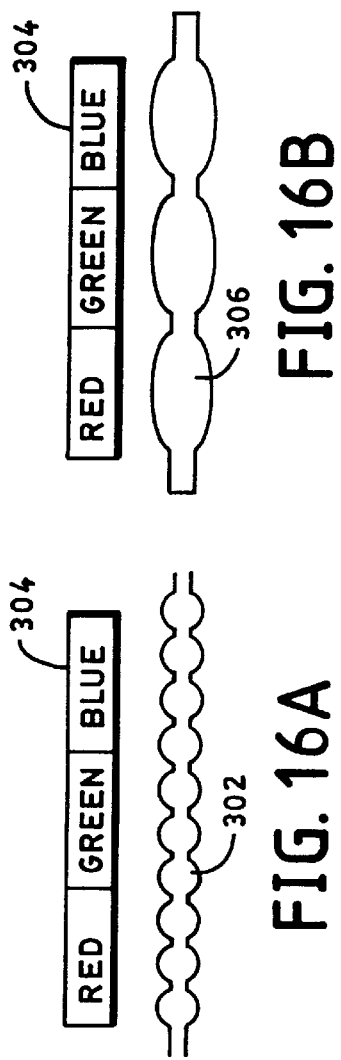
FIG. 16B
FIG. 16C
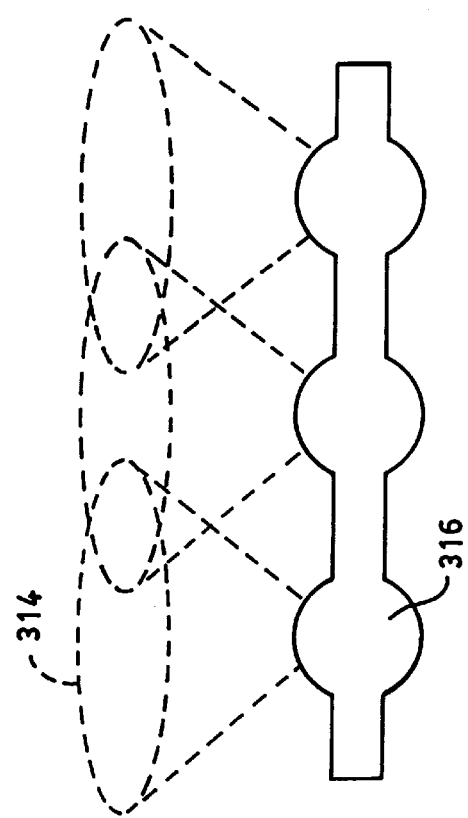
FIG. 17A
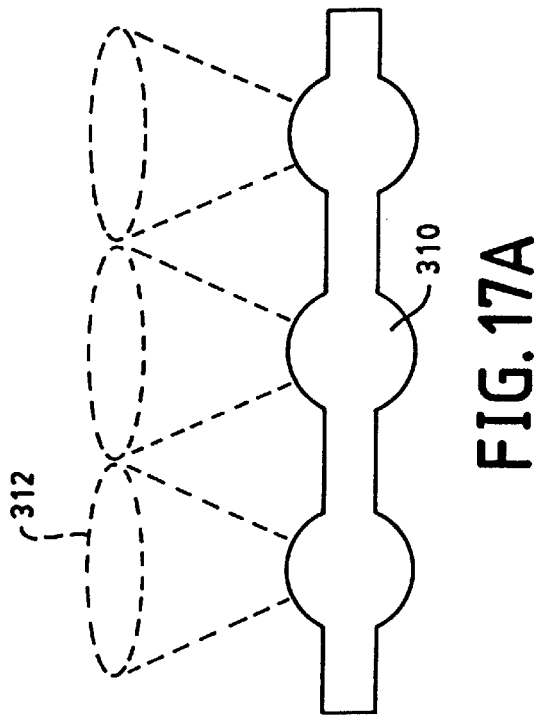
FIG. 17B

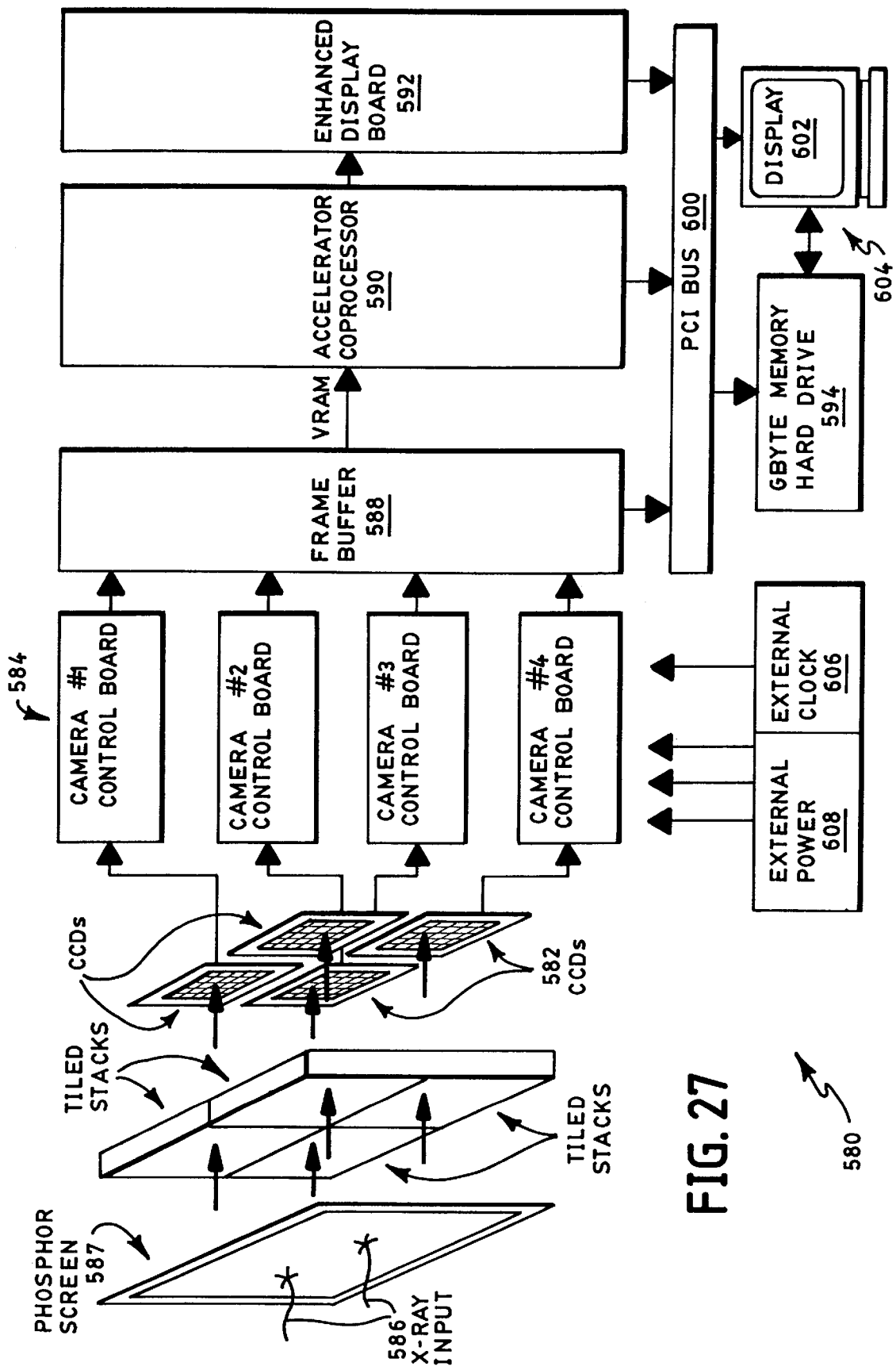

LENSLET ARRAY SYSTEMS AND METHODS

RELATED APPLICATIONS

This application is a continuation-in-part of commonly-owned and U.S. application Ser. No. 08/786,752, now U.S. Pat. No. 5,973,844, entitled Lenslet Array Systems and Methods and filed on Jan. 24, 1997, which is a continuing application of U.S. Provisional Application No. 60/010,670 entitled Stacked Array Imaging System and filed On Jan. 26, 1996, each of which are hereby incorporated by reference.

BACKGROUND

Imagery is presented in many forms. In the classical optical camera, for example, light energy from an object scene is focused through glass optics onto a film formatted image plane where light sensitive film records the scene. Typically, the film format corresponds to "35 mm" film, which translates to maximum linear dimensions of 36.3 mm (horizontal) by 24.2 mm (vertical), or a vertical-to-horizontal ratio of 3:2.

In the electronic age, the classical film-formatted camera is being quickly replaced by the solid-state camera utilizing charge coupled devices such as the "CCD" array. Typically, the CCD array is formatted to conveniently correlate with the computer display screen, which has a horizontal-to-vertical aspect ratio of 4:3. In this manner, the CCD array and computer display are matched on a pixel-to-pixel basis.

However, regardless of the high quality image presented by the classical film-formatted camera, its optics and housing are unsuitable for application with the CCD array. Accordingly, as users convert to digital cameras, their older film-formatted cameras shall become obsolete. Not only will the typical user have to buy a new camera, i.e., the digital camera, she will discard or retire the film-formatted camera, creating both cost and waste.

It is, accordingly, one object of the invention to provide apparatus and methods for adapting film-formatted cameras to solid state devices such as the CCD array in a compact and useful manner. A corollary object of the invention is to provide reimaging methods to achieve selected magnification and/or demagnification for each of the tangential and sagittal axes.

The prior art is known to have created optical systems for relaying and magnifying or demagnifying optical images by way of an optical system such as a relay lens. Specifically, in the prior art, it is known that a relay lens can be used to relay one image plane to another image plane at a selected magnification (or demagnification) ratio. However, such an arrangement is unwieldy and would generally double the size of the classical camera, making the approach nonpractical as a solution to the above-described problem. Further, it is very difficult, and thus costly, to simultaneously provide selected magnifications for both of the tangential and sagittal axes. By way of example, it is known that an astigmatic optical element provides such a bifurcated magnification; however, this element requires additional aspheric processing, adding cost, time and complexity to the manufacturing process.

The problems discussed above are symptomatic of a wide range of display problems and inconveniences experienced today. In the electronic and medical world, for example, imagery is often displayed on a television (TV), a computer display, the liquid crystal display (LCD), the cathode ray tube (CRT), light-emitting diode arrays, and back projection systems. It is often desirable, however, to illustrate the electronic display in a different format such as to a wider audience on a large format display. In the prior art, for example, complex projection systems are sometimes used to relay a smaller electronic display onto a large, reflective surface such as a white wall or a projection screen. However, it is widely understood that projection display systems are large in size, expensive, and heavy; and they inefficiently consume large amounts of electrical power. They are also generally limited to use in darkened areas due to low luminance output and poor efficiency.

An electronic display that is generally defined as a Flat Panel Display (FPD) has other difficulties that are not adequately addressed in the prior art, such as limitations in luminance and angular view. The active matrix thin film transistor liquid crystal display (AM-TFT LCD), the passive LCD, the field emission display (FED), and other FPDs (such as plasma displays and electroluminescent displays) each have characteristic angular fields due to inherent construction, polarizing filters and fore- and back-light characteristics (if required). One example of the angular limitations inherent in a FPD is readily seen in observing a portable computer screen from different angles: the portable FPD is barely visible, if at all, from viewing angles greater than about forty-five degrees from the normal to the screen surface.

The angular and luminance limitations associated with viewing a FPD are thus significant. Most observers prefer to view an image that is highly uniform in luminance over a wide field angle. This further compounds the difficulty in converting the FPD to a large format display. In addition, daylight viewing and the suppression of glare often necessitate additional screens or intermediate optics between the FPD and the observer, adding other costs and complexity. In certain applications, the prior art has attempted, without great success or efficiency, to improve the field of view of the FPD through the addition of diffractive spatial filters placed adjacent to the FPD screen.

There is the need, therefore, of enhancing the performance of the FPD. It is, accordingly, an object of the invention to provide apparatus and methods for enhancing the luminance and field of view of the FPD. A further object of the invention is to provide systems for converting the FPD to a large format display with improved luminance and field of view.

Highly commercial electronic displays have still other difficulties. For example, very large commercial advertising and stadium-sized matrix displays are assembled using tiles of bulbs, CRTs, light emitting diodes (LEDs), or LCD panels. Not only are these systems limited in resolution, color (note, e.g., that LEDs are typically one color) and general optical performance, they are expensive, costing in the neighborhood of $100,000 per square meter. They additionally have low reliability standards and few specifications or limitations on weight, power consumption and efficiency.

It is, accordingly, an object of the invention to provide a system which transforms the image presented by an electronic display—such as the LCD, the CRT, the FPD, phosphor displays, an array of LEDs, a computer screen, and a pixelated object—into a reformatted image with enhanced or modified features, such as with selected magnification, astigmatism, distortion, optical correction, optical processing, and Fourier content.

Another object of the invention is to provide apparatus and methods for magnifying or demagnifying an image of an object with a compact and substantially monolithic optical system.

Still another object of the invention is to provide methods of manufacturing and constructing combinations of lenslet arrays to achieve magnification or demagnification selectively.

Yet another object of the invention is to provide optical correlating apparatus and methods for conveniently achieving Fourier processing of an electromagnetic field.

These and other objects will become apparent in the description which follows.

SUMMARY OF THE INVENTION

As used herein, "magnification" is sometimes used to denote both magnification and demagnification. Accordingly, "magnification" is sometimes used herein to denote a magnification of greater than one, a demagnification of less than one, and unit magnification.

As used herein, a "lenslet array" refers to an array of microlenslets that are arranged into an optical substrate surface. A single lenslet array can therefore include an array of refractive lenslets or an array of non-refractive lenslets. As used herein, "non-refractive lenslets" generally mean diffractive lenslets. However, non-refractive lenslets can include holographic steering lenslets, phase modulating lenslets, and index modulating lenslets (including gradient index modulation formed through ion implantation and ion exchange, and effective index modulation using nanometer cuts within a substrate surface). A lenslet array is formed with an optical surface substrate which is typically planar except for the micro-features of the microlenslets. However, those skilled in the art will appreciate that lenslets arrays can be formed internally to an optical substrate—and thus not on the surface—or onto curved surfaces (e.g., macrolenses) which provide additional optical power.

A "stack" as used herein refers to a plurality of lenslet arrays arranged substantially adjacent to one another to operate as a single optical system. Generally, a stack has at least two lenslet arrays forming an array of "lenslet. channels," each of which has at least one refractive lenslet and at least one non-refractive lenslet. In order to achieve radiation transfer along each lenslet channel, each lenslet array in a stack typically has like numbers of lenslets so that there is a one-to-one correspondence between the lenslets of one channel (that is, each lenslet of each array has a corresponding lenslet in each of the other arrays; the corresponding lenslets forming the channel between the several arrays).

As used herein, a "tile" refers to mosaic of like elements to operate, substantially, as a single element. In the typical case, a tile can be formed, for example, by an array of like lenslet array stacks which are abutted, end to end, so as to substantially function as a single stack.

As used herein, a "stacked array imaging system", or "SAM," refers to an imaging system such as a stack arranged to view and image objects. For example, a SAM can include a magnifying or demagnifying optical system.

As used herein, "pixelated" refers to the quantized nature of certain objects and images. For example, most computer displays are made up of a thousands of pixels emitting light energy at the command of the computer's central processing unit (CPU). Such a display is "pixelated" since it is quantized. By way of another example, a solid state device such as a CAMCORDER records continuous, real-world imagery via a CCD array; and the data captured by the CAMCORDER is thus pixelated or "discrete." High speed computing via fiber-optics and electrical paths can also be "pixelated" in that data, often made up of large digital words, are processed in a massively parallel fashion (sometimes denoted herein as "massive parallel processing" or "MPP"). By way of comparison, real world objects like a human being are continuous; and a picture (i.e., an image) taken of real world objects onto film emulsion is also continuous since it is not quantized.

In one aspect, the invention provides a stacked array magnifier (SAM) for forming a magnified image of an object. The SAM includes one or more non-refractive lenslet arrays and one or more refractive lenslet arrays to form a plurality of lenslet channels. Each lenslet channel has at least one refractive lenslet and at least one non-refractive lenslet, and the lenslet channels between at least two adjacent arrays are sloped relative to an optical axis between the object and the image. The sloped lenslet channels that are further from the optical axis have larger slopes than the sloped lenslet channels closer to the optical axis. Together, the slopes of the several channels provide selective magnification between the object and the image.

In another aspect, the lenslet arrays form a stack between a first surface facing the object and a second surface facing the image. The lenslet channels extend further from the optical axis at the first surface, and closer to the optical axis at the second surface, thereby providing demagnification of the object at the image. Such an aspect can include a solid state focal plane at the image plane which is substantially perpendicular to the optical axis so as to receive electromagnetic radiation from the object.

In still another aspect, the lenslet arrays form a stack between a first surface facing the object and a second surface facing the image. The lenslet channels extend further from the optical axis at the second surface and closer to the optical axis at the first surface, thereby providing magnification of the object at the image.

In accord with the invention, the lenslet channels typically have clear aperture diameters of between about 5 $\mu$m and 1000 $\mu$m. As shown herein, certain experimentation was conducted with clear apertures of about 168 $\mu$m.

In another aspect, the stack can include a macrolens—i.e., a lens element that is substantially larger than any of the lenslets—that is arranged between at least two adjacent arrays. The macrolens is included, generally, to add optical power between the object and image.

To effect continuous imaging, in another aspect, a plurality of lenslet channels are arranged so as to contribute to each point in the image. In order to provide an erect image, the SAM must have 2n+1 internal images, where n is an integer.

Lenslet arrays can be constructed and arranged according to the invention to provide a magnification ratio of less than about 8:1 between the object and the image. A second stacked array magnifier can thus be used, in sequence, to provide secondary magnification of the object to a secondary image along the optical axis. The second SAM is substantially similar to the first SAM, though the magnification need not be the same. In this manner, a magnification from each SAM is multiplied—e.g., 8:1×8:1, which provides an overall magnification of 64:1.

In other aspects, the SAM is transmissive to visible electromagnetic radiation between about 400 nm and 750 nm. As such, a CCD array can be conveniently arranged at the image and substantially perpendicular to the optical axis so as to collect the visible electromagnetic radiation from the object. However, SAMs of the invention can be made to function with any range of wavelengths, such as the ultraviolet and infrared.

For example, the SAM can also be made transmissive to infrared electromagnetic radiation; and can include "uncooled" microbolometer arrays or other IR detectors, e.g., HgCdTe, at the focal plane. In another aspect, the lenslet arrays are made transmissive to visible electromagnetic radiation between about 540 nm and 580 nm, which corresponds to certain phosphor display devices in the medical arts. Accordingly, the SAM material is optimized in transmission and diffraction features within the wavelength of interest. Note that the non-refractive lenslets have greater efficiency for a smaller waveband when optimized to that waveband. By way of example, those skilled in the art should appreciate that non-refractive lenslet arrays which include blaze grating features have the best efficiency at the designed wavelength. Blaze gratings can be optimized in angle to provide peak diffraction efficiency, for example, at phosphor emission wavelengths.

To restrict the FOV and to reduce cross-talk, at least one refractive lenslet array of the invention can operate to form an intermediate image of the object and within the SAM. A field stop is then located at the intermediate image—or very near to the image—to limit the field of view of one or more lenslet channels. Similarly, a Lyot stop can be located at the intermediate image to reduce cross-talk from out-of-field radiation (preferably, the stop reduces stray light cross-talk to less than about 10% of all of the electromagnetic radiation transmitted from the object and to the image). To be most effective, the stops should be within about a blur distance from the internal SAM image, whereby the defocus wavefront error is less than about $\frac{1}{4}\lambda$.

In a preferred aspect of the invention, each lenslet channel includes an array of three lenslets at each lenslet array. These three lenslets are transmissive to a unique RBG color such that substantially any color can be transmitted along each channel. At the same time, each of the non-refractive lenslets are preferably optimized for optical efficiency corresponding to the RBG color associated with its channel.

The invention also provides for interlaced imaging, or for pixelated imaging so as to produce an array of discrete images of the object. In this latter aspect, the FOV of each channel is substantially non-overlapping with adjacent channels to accommodate efficient discrete collection by a solid state sensor.

The lenslet arrays of the invention can also include, in another aspect, one or more optical coatings to improve optical transmission through one or more lenslet channels.

In one aspect, a SAM is constructed and arranged so as to have an overall f-number that is less than any of the lenslet f-numbers. For example, if each of the lenslet channels is constructed and arranged so as have an f-number of f/1 or greater, the overall f-number of the magnifier is less than about f/1.

In yet another aspect, the SAM of the invention can include means for creating diffraction orders of electromagnetic radiation transmitted between the object and the image, the orders being sufficient to provide greater than approximately 90% efficiency. Similar means can also be included to improve the imaging resolution within the image with a modulation transfer function of greater than about 10% at image frequencies greater than about 500 lp/mm.

In certain aspects, lenslets of the invention can include refractive surfaces with aspheric shapes. In other aspects, means for reducing distortion is included such that the image distortion is less than about 2%. By way of example, the distortion reduction means can include edge lenslets having more or less power than other lenslets within the same array. These edge lenslets are adjacent to one or more edges of the magnifier so as to compensate for pincushion, barrel or petzval distortion.

The invention also provides for certain improvements in a method of manufacturing a microlenslet array of the type having a plurality of lenslets formed within a optical substrate having a first planar surface, a second planar surface, and a normal vector that is substantially perpendicular to each surface. Specifically, the improvement of the invention includes the steps of forming a first lenslet array within the first surface, forming a second lenslet array within the second surface, forming a plurality of lenslet channels between the lenslet arrays wherein each channel includes one lenslet from each of the arrays, the lenslet channels between at least two adjacent arrays having a channel axis vector relative to the normal vector such that the cross product between the channel axis vector and the optical axis vector is greater for lenslet channels further away from a line extending along a center of the substrate and parallel to the normal vector.

In another aspect, a method of manufacturing a microlens stack is provided for producing a magnified image of an object along an optical axis, including the steps of: combining at least two refractive lenslet arrays with at least one diffractive lenslet array to form a lenslet array stack with a plurality of lenslet channels, each of the channels having a sloped axis between at least two of the arrays, and arranging the channels such that the cross product between the sloped axis and the optical axis is greater for lenslet channels further from the optical axis as compared to lenslet channels closer to the optical axis, thereby achieving the magnification selectively.

Such a method can include, in another aspect, the step of arranging the channels such that at least two channels contribute to the image of each point of the object, providing continuous imagery. The method can also include the step of arranging at least one array so as to produce an intermediate image of the object and between other arrays, and inserting a field stop at the intermediate image so as to reduce the field of view of at least one channel.

In still another aspect, a tiled array imager is provided for generating an image of an object along an optical axis between the object and the image. To form the tiled array, at least two stacks are arranged substantially perpendicular to the optical axis. Each of the stacks are formed of a plurality of lenslet arrays including one or more non-refractive lenslet arrays and one or more refractive lenslet arrays. Each lenslet array within a tiled array acts substantially in concert as a single lenslet array; and the tiled arrays form a plurality of lenslet channels. Each of the channels between at least two arrays has a channel axis with a predefined slope relative to the optical axis. The lenslet channels further from the optical axis have a larger slope than lenslet channels closer to the optical axis. These slopes providing demagnification between the object and the image.

The invention also provides for scene generating apparatus, including: a computer for generating signals representative of an selected pattern; a flat panel display responsive to the signals to display the pattern, the display having a display center and a normal vector perpendicular to a face of the display means; a plurality of lenslet arrays formed into a stack having a plurality of lenslet channels, the channels between at least two arrays having a sloped channel axis relative to the surface normal vector, the lenslet arrays being constructed and arranged to generate an image of the pattern on the display means, the cross product of the sloped channel axis and the surface normal vector being larger for channels further from the center as compared to channels doser to the center wherein selective magnification of the image is achieved.

In another aspect, a digital camera is provided, including: a film-formatted camera body and camera lens which generate an image of a scene at an image plane within the camera body and in a format corresponding to 35 mm film; one or more non-refractive lenslet arrays and one or more refractive lenslet arrays are formed into a stack with a first outer surface and a second outer surface, the stack being constructed and arranged to fit with the camera body, the lenslet arrays forming a plurality of lenslet channels which act in concert to form a secondary image of the camera's first image that is sized to a solid state focal plane array; and a solid state focal plane array arranged at the secondary image.

In yet another aspect, a digital camera is provided, including: a solid state imaging device of the type that includes an array of detector pixels responsive to electromagnetic radiation within a range of wavelengths; a window for protecting the device and for imaging the radiation onto the device, the window having one or more non-refractive lenslet arrays and one or more refractive lenslet arrays formed into a stack, the stack being constructed and arranged over the device and forming a plurality of lenslet channels which act in concert to form an image that is sized to the device.

The invention also provides a compact optical correlator for imaging an object to a solid state detector, including: a first stack and a second stack arranged substantially perpendicular to an axis formed between the object and the detector, each stack having one or more non-refractive lenslet arrays and one or more refractive lenslet arrays, the lenslet arrays forming a plurality of lenslet channels wherein each channel includes one lenslet from each of the other arrays, the first stack generating a Fourier image between the first and second stacks at a filtering plane, the second stack generating an image of the Fourier image such that the object is reimaged onto the detector; and an optical filter arranged at the filtering plane for selectively filtering electromagnetic energy so as to achieve selected optical processing.

In one aspect of the invention, a lenslet array stack is integrated with other like lenslet array stacks in a seamless tile so as to achieve a large format display. Each stack includes at least one refractive lenslet array and at least one non-refractive lenslet array. The stacks are abutted in a manner which achieves the size of the desired large format display; the abutted stacks thus functioning, substantially, as a single stack. At the point of intersection between adjacent stacks, the individual stacks provide substantially 100% fill factor; and thus the intersection is substantially unnoticeable.

By way of example, advancements in microelectronics manufacturing technology have recently produced miniature FPDs with relatively low cost, and high quality, resolution and yield. These miniature FPDs typically have pixel clear aperture sizes of about twenty-five microns and an overall dimension of 12.7 mm by 12.7 mm (standard LCD pixel sizes, by contrast, are typically about two hundred and fifty microns, or one hundred dots per inch). They are used, for example, within head-mounted displays for defense and commercial applications. The miniature FPDs offer high optical performance and good contrast with about twenty to forty lines-per-mm resolution. In accord with one aspect of the invention, an array of miniature FPDs are tiled into a larger FPD of selected size. One or more lenslet array stacks are thus arranged so as to reimage and magnify the tiled FPD into a large format display. In one practical aspect, the stacks too are tiled. Accordingly, the tiled stacks and the tiled miniature FPDs provide a convenient and efficient large format display of minimal thickness and with substantially seamless effects caused by the tiling. The FPD is thus scaleable, according to the invention, in a flexible, low cost, high performance assembly.

Lenslet array stacks of the invention can provide selective magnification, as discussed herein. Like magnification stacks can also be arranged, in sequence, to achieve integer multiple magnifications between an object and image. Accordingly, and in another aspect of the invention, one method of the invention is to provide a magnification of n*M, wherein n denotes the number of lenslet array stacks, and where M denotes the magnification of the stack in the sequence.

The lenslet arrays of the invention can be formed in optical grade polymer, fused silica, quartz, sapphire, calcium, fluoride, optical grade glass, silicon, germanium, gallium arsenic, silicon carbide, zinc sulfide, zinc selenide, and other glass or crystalline materials that transmit ultraviolet, visible or infrared light with low absorption and high efficiency. Certain polymers, gels and other organic materials can also be used, such as bacteriorhodopsin, as known to those skilled in the art.

The invention provides several advantages and has widely varying uses. It provides, for example, hybrid diffractive-refractive optical magnifiers for use in optical display and imaging systems, e.g., flat panel displays, classical cameras, and medical imagers. In one practical application, the invention has beneficial use in bridging 35 mm film technology to the digital age by conveniently reformatting the classical image plane to the industrial sizes of the modern day solid-state devices. In the realm of Fourier and/or digital systems, the invention further provides a convenient forum from which to implement a variety of optical correlation or processing techniques, including Fourier processing, optical computing, and data transmission methods. Certain other applications, aspects and advantages are realized by the invention, including:

(1) Hybrid lenslet arrays (i.e., lenslet arrays made from refractive lenslets and at least one array of non-refractive lenslets) of the invention can provide selective magnification of miniature flat panel electronic displays. These arrays form a system that exploits the advances made in microelectronic packaging and manufacturing so that high resolution active matrix displays are available at high yield and low cost. Such a system further enables a large visible field with a high fill factor (i.e., high throughput and "frameless" operation so that the joint between adjacent stacks in a tile are unnoticeable) and yet with low overall weight, size and complexity.

(2) Hybrid lenslet arrays according to the invention are generally scaleable such that stacks of adjacent arrays perform like functions so as to provide a combined effect with reduced overall manufacturing complexity. For example, a hybrid array with an achieved magnification of two hundred percent can be combined with a similar array to achieve an overall object-to-image magnification of four hundred percent. This obviously permits the simultaneous and simplified manufacture of like arrays along a common manufacturing line, which lowers cost and which increases production yield.

(3) Because of the high resolution and low weight provided by a system of the invention, hybrid arrays of the invention are particularly suited to avionic displays; optical systems at command and control centers; high definition television (HDTV); passenger, conference and stadium displays; virtual conference centers; and active billboards.

(4) A hybrid lenslet array forming a stack according to the invention preferably has precise registration along the individual lenslet channels defined by the stack transfer, transform or optical radiation transfer from object space to image space. This provides accuracy in characteristics of image quality, optical computing and processing.

(5) A stack of microlenslet arrays according to the invention can provide either magnification or demagnification for a variety of specific applications.

(6) Microlenslet surface structure, according to the invention, can be (a) refractive, (b) diffractive kineforms, (c) high order, high efficiency diffractive steering or focusing lenslets, (d) holograms or holographic lenslets, (e) computer generated holograms, (f) effective index modulating surface arrays, (g) apodizing or other spatial filters, and arrays of stops, or (h) other features typically generated by lithographic and semiconductor fabrication technology.

(7) In accord with the invention, hybrid lenslet arrays are formed into a stack—a process sometimes denoted herein as "hybridization"—of different surface types (refractive and diffractive in nature) to provide excellent color, aberration or other correction for high efficiency, high Modulation Transfer Function (MTF) and uniformity over a large aperture optical system.

(8) When combined with a mechanical support structure, the input and/or output surfaces of a stack provide a clear aperture which is at least equivalent to, or greater than, the mechanical aperture of the support structure. This permits seamless, or "frameless," tiling of a plurality of stacks into an infinitely scaleable, tiled, massive parallel processed array for very large display or image acquisition over a large field of view. "Massive parallel processing;" as sometimes referred to herein, means the parallel addressing and control of solid state devices like the. CCD and frame readout for the tiled imaging or FPD projection system constructed according to the invention. Massive parallel processing effects simultaneous activation or control of tile elements for real-time applications (i.e., many frames per second). By way of example, if control and readout electronics were serial, as opposed to parallel, then the screen or refresh rates can extend an unreasonable period of several minutes.

(9) Microlenslet fabrication of an array of stacks, e.g., to form a tile and/or to achieve integer and repeated magnification effects, permits the cost effective manufacture of large scale assemblies. By way of example, massive parallel processing of discrete tile subassemblies allows for cost effective computer control of large scale, seamlessly tiled array systems and at very large speeds such as real-time video rates or faster.

(10) A lenslet array, according to the invention, can include macroscopic planar or refractive lens surfaces in addition to the microlenslet surface structures. Such a lenslet array can provide macroscopic radiation transfer according to a first purpose, and lenslet channel radiation transfer according to a second purpose. In addition, a lenslet array of the invention can and usually does include interstitial planar microsurfaces, arranged between adjacent lenslets, that do not generally contribute to the overall optical throughput from the object to the image.

(11) In certain aspects of the invention, a stack of hybrid lenslet arrays are arranged to efficiently reimage a discrete pixelated object into a discrete pixelated image. Alternatively, such a stack can be arranged to image an object into a continuous image—without dark spaces, gaps or blurred regions between adjacent pixels or local image areas at the image plane—by careful image interlacing of adjacent channels or kernels of channels in the stacked array structure.

(12) Image interlacing of adjacent lenslet channels provides a uniform, high efficiency optical tile system with a total optical path length or working distance which scales with the size and f-number of the channels. This provides for a flat panel optical system with a thickness, weight and mass that is smaller than that which is typical for a conventional macroscopic lens or mirror optical system.

(13) The lenslet arrays of the invention can be represented by a uniform array of lenslets of equal surface figure at regular spaced intervals, or by kernels of subarray lenslets of equal surface figure at regular spaced intervals, or by uniquely different lenslets at regular or irregular spacing. In certain aspects the lenslet arrays can be formed of lenslets with varying distance from adjacent lenslets dependent upon a location from an optical or mechanical center of the lenslet array surface. In yet other aspects, the lenslet arrays are arranged in a radially symmetric fashion, in a mainer easily defined by the Cartesian coordinate system, or in another group symmetry.

(14) The microlenslets of the invention can have circular, square, hexagonal or other regularly shaped apertures which are equal to or smaller to the lenslet-to-lenslet center spacing (i.e., so as to provide a zone, between lenslets, that does not transfer radiation along a lenslet channel). Nevertheless, lenslets are usually circular in shape.

(15) The microlenslets, the microlenslet surfaces, and/or the spaces between adjacent lenslets can contain hard stops, masks or opaque zones to achieve one or more of the following: to control crosstalk, to eliminate or reduce stray light, to reduce image artifacts and aberrations, to maximizing image contrast, and to optimize MTF. Intra-element stops or opaque zones can be fabricated by chemical modification of the lenslet array substrate material, by trench etching, and by thermal or other physical processing. Surface stops can be fabricated using physical deposition, chemical modification, printing or other process for depositing or placement of opaque material in the interstices between lenslets. Inter-element stops can include a metal or other opaque mask which also provides for accurate spacing and precision as to the location of adjacent arrays in the stack.

(16) A hybrid lenslet stack of the invention provides magnification or demagnification, in one aspect, by outward or inward tilting of lenslets channels relative to an optical axis. In another aspect, the stack can also utilize microlenslet array channels to effect magnification or demagnification by outward or inward steering of individual lenslet channel axes. Further, magnification (or demagnification) can be divided equally or unequally between arrays within a stack, or between stacks arranged as a sequence of stacks in a single optical train.

(17) In the case of pixelated objects or images, individual lenslet apertures can be smaller than, equal to, or larger than the pixelated dimensions of the object or image. Lenslet apertures which are larger than the pixel dimensions of the object or image can have (a) fields of view covering a plurality of the pixels in object or image space, or (b) a field of view which exceeds the aperture of the lenslet with potential overlap among the fields of view of multiple lenslet channels. Lenslets apertures that equal the pixelated dimensions in object space can (a) transfer the image of many object pixels or just one object pixel, or (b) have field of view equal to the lenslet aperture dimension. Lenslets with apertures that are smaller than the pixelated object and/or image dimensions can utilize or interlace the images of a plurality of lenslets so as to image one point in object space to one point in image space.

Lenslets which have an aperture that equals the field of view are the least preferred configuration due to the extremely tight tolerance required in fabrication, registration, and the low defect density required to achieve uniform image transfer. Lenslets with apertures that are larger than the lenslet's field of view require simpler masks for fabrication with reduced features; but defect densities can not be tolerated unless multiple lenslet channels are used to image a single point in object space to image space. Lenslet arrays with small aperture sizes, relative to the lenslet's field of view, require the most complicated masks for fabrication and the lowest packing fraction for optical efficiency; but also allow for the greatest tolerance in registration and defect density due to the interlacing of images from many channels from a single object point.

(18) Hybrid lenslet array stacks according to the invention can provide inverted or erect images. Systems with erect images require an odd number (i .e., 1, 3, 5, . . . or 2n+1, where n is an integer number) of field stops or field image surfaces internal to the stack structure. Systems with an inverted image output can have either zero or an even number of field stops or field image surfaces internal to the stack structure. Stacks with internal field images can incorporate field stops in the form of micromachined, electro-formed, molded or other aperture plates for aberration control or the improvement of image quality (e.g., MTF).

(19) Stacks constructed according to the invention generally include, at least, four lenslet array surfaces and two substrate elements. The stack can be assembled as a stack of discrete air-spaced elements with external mechanical fixturing or with mechanical spacers placed between the elements and arrays. Such a stack provides a stable, monolithic structure which easily integrates into a system, device or product.

Stack surfaces and/or spacers can include fiducial marks to facilitate micron-level registration and location of components. These fiducial marks can be deposited, or male or female patterns can be etched into, surfaces at interstices between microlenslets. The opposing surface or fiducial mark of the next element or spacer between elements can also have fiducial marks or a mating surface relief pattern to facilitate assembly and co-location of elements and components of the assembly.

Alternatively, the lenslet apertures can be register into one or more mask plates between adjacent elements of the stack to provide for co-location and precise positioning in x-, y- and z-axes of the hybrid stack. Monolithic, self-alignment construction of stack assemblies allows for compact, high performance optical systems with superior structural and environmental integrity in comparison to conventional optical systems. Stack optics can also be assembled with buried and cemented surfaces for added reliability and impermeability to contamination or dirt.

(20) Multi-element stack optical systems of the invention with one or more intermediate image planes facilitate the insertion of passive or active media at a field image or at a collimated space between two lenslets in the stack. Active media located at the field stop provides a convenient forum from which to accomplish optical processing, and can include: electro-optic modulators, liquid crystal light valves, active color filter mosaics, other spatial light modulators, computer generated holograms, and even gain media to accommodate a wide variety of applications for optical transform systems, compact optical correlators, optical network and computing systems, switching systems and numerous other optical signal processors. Fixed passive spatial filters, color filters, or encryption filters can also be colocated at a field image in the stack assembly to create a wide variety of fixed or passive optical signal processing systems. Again, the compact, monolithic nature of the stack assembly allows for ease of assembly and integration with internal devices, associated electronics and mechanical fixturing.

(21) Stack components and assemblies can be fabricated using a wide variety of materials and methods compatible with volume microelectronics assembly tooling and equipment. Substrates can be semiconductor, glass, single crystal, polycrystalline, liquid crystal, polymer or other optically transmissive material amenable to processing into microlenslet arrays. Metal or other solid negative masters can be used for mold fabrication of hybrid lenslet arrays and stacks. Hybrid arrays can also be cemented to bury surfaces for added reliability. Spacers between elements can be glass, metal, polymer, crystalline or other appropriate structural or optically opaque medium to facilitate registration and to enhance optical and mechanical properties. Active and passive devices located between elements, particularly at field image planes, can further incorporate electronics and mechanics for assembly and fixturing of stacks and lenslet arrays.

(22) Stacks and lenslet arrays of the invention can apply to applications across the optical spectrum, from the deep ultraviolet to the far infrared. Indeed, many semiconductor materials that facilitate microelectronic fabrication processing have excellent infrared transmission properties so as to support infrared applications. The compact, flat panel nature of the stack optical system allows for easy integration with an image plane device such as a focal plane array detector. The stack optics can also function as an optical signal processing window which isolates and protects the FPA device in a protective atmosphere, or in a controlled environment atmosphere such as cryogenic or other thermally controlled environment (e.g., heated, isothermal, and non-cryogenic-cooled).

(23) The stack assembly, according to the invention, provides a single optical assembly for use in imaging, display or detection applications using a single flat panel display, focal plane array, other direct display device or detector device. The ability to fabricate stack optics with nearly 100% clear aperture (relative to the mechanical size of the stack) allows for infinitely scaleable tiling of massive parallel processed arrays for very large flat panel displays or wide area, high resolution image acquisition systems.

(23) In addition to the applications discussed herein, the invention is particularly well suited for application with (a) massively parallel processed tiled large area FPD systems, (b) massively parallel processed large area real-time medical imaging systems, (c) compact optical correlators, (d) compact IR FPA imaging cameras with an integral cold stop, (e) compact CCD imaging systems, and (f) optical encryption systems for security applications.

The fabrication of a stack or SAM assembly according to the invention has many aspects, including:

(24) The lenslet arrays of the invention can be manufactured by molding an optical grade polymer, or by coextrusion of an optical polymer, with an opaque polymer. In one aspect, the mold is fabricated from a negative relief of the refractive and non-refractive lenslet surface features, plus fiducial marks and mechanical assembly features. The negative relief is then fabricated into a metal, ceramic or high temperature composite master, which is produced by micromachining or by direct forming into the master mold material. In another aspect, the mold is produced in an iterative manner by transferring a positive master in glass, semiconductor or crystal material to a ceramic or elastomer template, which creates the negative mold master.

(25) The arrays of the invention are made from a variety of substrate materials. Depending upon the wavelengths of operation, the substrates within a particular stack can be made from one or more different substrate materials so as to correct for optical color or to accomplish different distributions of optical power within the stack.

(26) Lenslet arrays of the invention can also be manufactured through replication. In this aspect, a mold is fabricated from a negative relief of the refractive and non-refractive lenslet microsurface features, as well as of the fiducial and mechanical assembly features. Preferably, the negative relief is fabricated into a metal, ceramic or high temperature composite master, which is produced by micromachining or by direct forming into the master mold material. The master is thereafter coated with a release agent followed, for example, by (a) an epoxy, (b) a polymer, (c) an optical quality organic, or (d) a sol gel material to produce a thin sheet of material with lenslet array features, fiducial marks, and mechanical assembly features to facilitate transfer and bonding to a flat optical substrate. The bulk optical substrate can additionally include opaque interstitial areas or masks to provide for stops and to eliminate or reduce optical crosstalk among nearby lenslet channels.

(27) Fabrication of lenslet arrays according to the invention can beneficially utilize substrates, equipment and process technology common to semiconductor microelectronic lithography. These semiconductor processes can include deposition and photoresist mask generation to facilitate the fabrication of surface features, the modification of the index of refraction, and the application of physical masks. Reactor processes common to semiconductor processing are also used, in other aspects, for chemical etching, reactive ion etching, plasma etching, physical vapor deposition, chemical vapor deposition, epitaxial growth, ion implantation, electron beam deposition, and other radiation exposure and activation processes to form refractive and non-refractive lenslet arrays with the selected substrate material.

(28) The interstitial regions between lenslet channels are preferably coated with an opaque material—such as metal, ceramic or oxide—using semiconductor microelectronic processes, particularly the reversal of the photomask resist process described above in paragraph (27).

(29) In a preferred aspect of the invention, the masks used to fabricate the lenslet arrays include fiducial features, which facilitate alignment and registration of lenslet array channels in Cartesian x-y and rotational coordinates. The fiducials are either located outside of the lenslet clear aperture or interstitial to the lenslet array features. These fiducials can be clear with an opaque background, or opaque in a transparent background.

(30) The fiducial features of the invention can frame the entire lenslet array mask, or parts of the lenslet array mask, or within interstitial regions to the lenslet array channels. Fiducials can be horizontal or vertical lines, sequences of lines, crossed lines, circles, squares, hexagons, other geometries or combinations of geometric shapes.

(31) Generally, the fiducial markings facilitate the manufacture of precise registration of photomasks and lenslet stacks by co-alignment and/or registration. The markings can also create optical effects to assist in this assembly process. For example, precise alignment of the marks within a substrate and relative to a side-to-side arrangement of arrays can be made to produce optical effects such as a Moire pattern or other interference effect so as to indicate proper registration.

(32) In a preferred aspect of the invention, lenslet array substrates are fabricated with additional fiducial marks, or surface relief features (etched below the surface or protruding above the plane of the lenslets) to facilitate stack assembly. In particular, these fiducials can be used to assist in the alignment of elements such as mechanical spacers between adjacent arrays, or in the positioning of stops or optoelectronic devices at an intermediate image plane. Their placement can be outside, or interstitial to, the array's clear aperture; and their shape can be in the form of lines, crosses, dots, rectangles, squares or other geometric features that permits visual or machine-aided alignment of stack elements. The fiducials can further facilitate mechanical pinning or interlocking of adjacent stack elements.

(33) In one convenient aspect of the invention, fiducial marks and assembly features are fabricated of metal or other target materials used in the masking of the interstitial and surrounding regions of the lenslets. In another aspect, the fiducial marks and assembly features are etched into the substrate. In yet another aspect, the fiducial marks and assembly features are fabricated onto mechanical spacers and other devices for placement within the stack.

(34) Fiducial marks and assembly features can be formed of solder, thermoset or other material that transforms from a solid to a liquid when subjected to heat or other activation such that a surface tension is created to promote alignment of the stack. The subsequent transformation of the fiducial and assembly features back to a solid thereby bonds the stack together into a monolithic structure.

(35) The stack can include lenslet surfaces that are immersed in an adhesive for monolithic bonding of the SAM.

(36) Stack assembly with micromechanical and electronic parts is greatly facilitated by visual or machine-aided tooling such as a microscope or other imaging devices. Typically, these devices have sufficient magnification to view the fiducial alignment microfeatures so as to facilitate precise array positioning in x, y and rotational coordinates.

(37) In another aspect, anaerobic, thermoset, room temperature adhesives or other bonding agents are used to assemble the stacks at the edges or at internal locations within the stack.

(38) Mechanical spacers and surface alignment features can include a gel, thermoset or a solder which bonds the stack together when activated at the point of proper registration.

(39) Stack alignment features can include thru-holes—at the edge of the stack's clear aperture or at interstitial locations relative to the lenslet channels—so as to provide for the insertion of micromechanical pins which assist stack assembly and which mechanically tie the stack into a monolithic structure.

(40) A substrate can include features which are designed into its outer surfaces to facilitate the assembly of the SAM relative to external mechanical mounts or housing structure. Further, such features can assist in the alignment and placement of an array relative to an imaging device, detector, or display device, e.g., a LCD. They can also facilitate assembly of a seamless tiled array construction of SAMs into a massive parallel processing system.

In another aspect, the invention also concerns a hybrid, refractive/diffractive, stacked optical lens array imaging system that transmit a two-dimensional image from an object plane to an image plane. Specifically, the imaging system utilizes a stack of arrays of lenses, each array comprising a plurality of small apertured lenses ("microlenses" or "lenslets"). The optical imaging system includes micro-optics with a relatively short focal length and high optical efficiency and high resolution for imaging with or without magnification or demagnification. The optics thus form a "stack" of a plurality of hybrid (i.e., refractive, diffractive, etc.) lenslet arrays.

The system can provide for finite conjugate imaging or infinite conjugate imaging, and contains a least one or more intermediate field images with an erect or inverted image at the overall system output image plane. The system can further reimage a pixelated object space to a discrete array image space. The system can also reimage a continuous object to a continuous image without dark spaces, gaps or blurred regions between pixels or image areas at the image plane.

Each array of lenslets may incorporate integral hard stops (such as chrome baffles) or opaque zones between lenslets for control of crosstalk, for minimization of stray light, and for maximization of image contrast and the modulation transfer function. A key aspect of the system is the interlacing of images from adjacent lenslet channels so that multiple lenslet channels may contribute to reimaging a point or pixel in object space to a corresponding point or pixel in image space. The effective f-number of the system is therefore smaller than the f-number of a single lenslet channel. The thickness of the system is a function of lenslet size, f-number and optical lens material, and is therefore substantially thinner than an equivalent optical system using large aperture macrolenses.

The stack of lenslet arrays can be configured and assembled within a monolithic structure for simplicity of construction and alignment. The image interlacing property of the system accommodates a large tolerance for lateral misalignment due to the contribution of multiple lenslet channels to the complete, continuous image.

The number of lenslets in each array stack can be greater than, equal to, or less than the total number of pixels in object or image space. Magnification can be divided equally among the lenslets or in various portions between the optical stack before and after the field stop array. Individual lenslets or entire lenslet arrays can be tilted inward or outward for magnification or demagnification. Lenslet arrays can be formed on planar substrates or can be hybridized with macrolens substrates. The lenslet surface figures can be constant over one array surface with uniform spacing. In the alternative, the surface figures can be arranged in kernels of n by m lenslets of constant figure or with changing figure in the adjacent kernels of lenslets. Or, the surface figures can vary step-wise across the entire aperture of the stack such that every lenslet has a unique figure unto itself.

The field stop array can incorporate either an array of reticles, a spatial light modulator, or other passive or active optical systems or media. The lenslets can be refractive, diffractive, holographically generated, or gradient indexed. The value of hybrid lenslet arrays is for chromatic correction, aberration correction or possible encryption to produce a desired corrected or processed image at the image plane.

The excellent uniformity of optical throughput and image quality across the entire clear aperture of the system at the image plane output allows for fabrication of "tiles" of the stacks with optics to the edge for 100% clear aperture. The tiles can be integrated into a very large, infinitely scaleable imaging or display system in a seamless fashion. For example, in one aspect, a large, high resolution, flat panel electronic wall display is formed using a plurality of small liquid crystal displays ("LCDs"), miniature flat panel displays ("FPDs") or other compact displays, magnified and imaged through a mosaic array of tiles. In another example, an ultra-high resolution, large area, charge coupled device ("CCD") medical X-ray imaging system is formed by tiling stacks with X-ray phosphor screen inputs to small, low-cost, high-speed CCD camera outputs. Massive parallel processors ("MPPs") integrated within a high speed computer system permit video rate, real-time, or other high frame and data rate transfer of an image in the case of the medical X-ray system, or active display in the case of the wall display.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIGS. 10A–10C show, respectively, holographic lenslet manufacture, a representative holographic lenslet, and a resulting operation of such a holographic array, in accord with the invention;

FIGS. 11A–11B show, respectively, phase modulation lenslet manufacture and a resulting operation of a phase modulation array, in accord with the invention;

FIGS. 12A–12C show, respectively, index modulating lenslet manufacture, a representative gradient index lenslet, and a representative Gaussian-shaped index lenslet, in accord with the invention; and FIG. 12D shows an alternative index modulation lenslet manufacture utilizing nanometer-sized substrate cuts;

FIGS. 16A–16C illustrate different lenslet FOVs relative to an RGB object, in accord with the invention;

FIGS. 17A–17B illustrate how lenslet FOV impacts image defects;

FIG. 27 is a schematic diagram of the system of FIG. 26 incorporated into a computer-controlled, multi-stack embodiment of the invention.

DETAILED DESCRIPTION OF THE DRAWINGS

Figure 1:
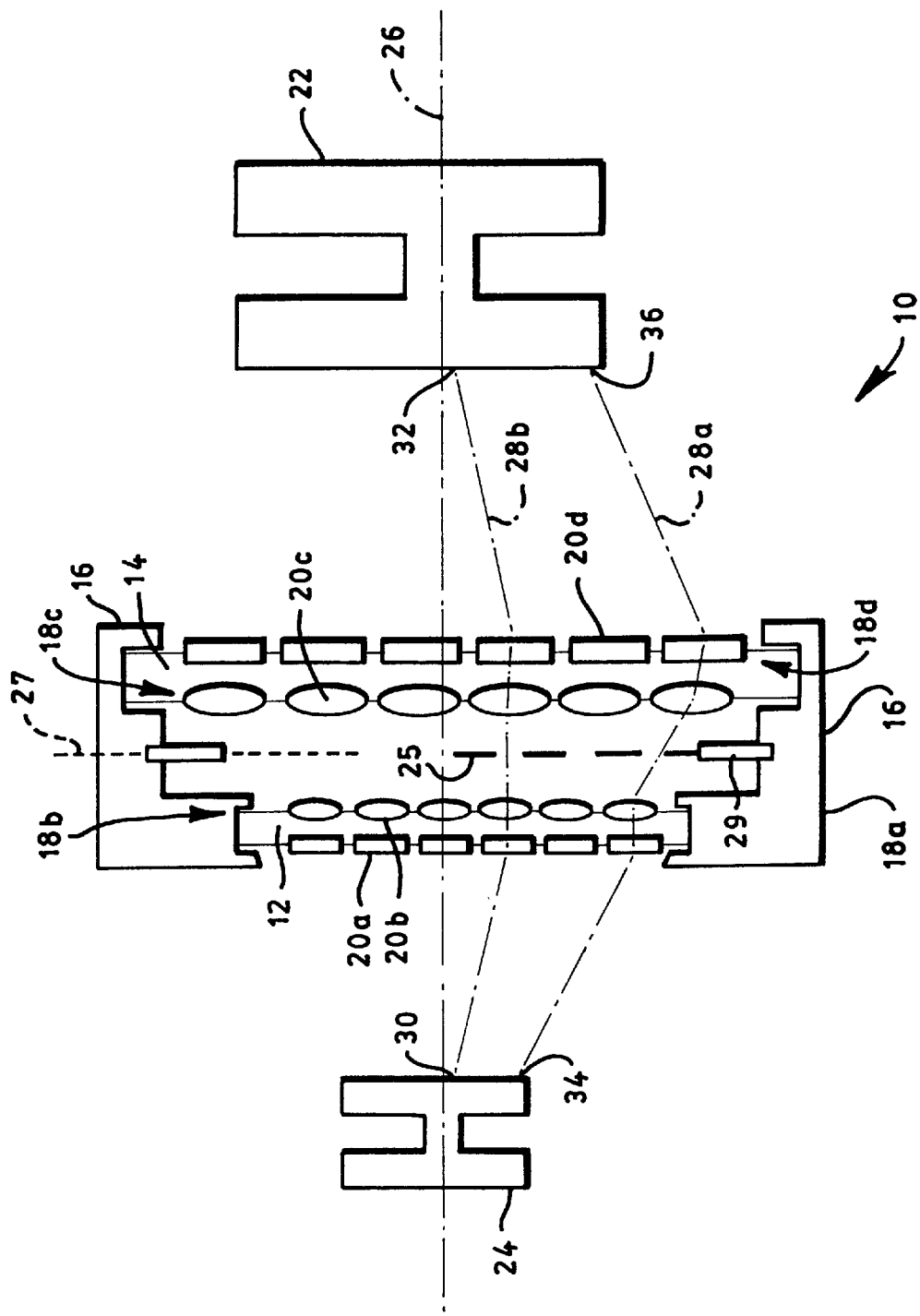
FIG. 1 shows a cut-away side view of a stacked array magnifier constructed according to the invention.

FIG. 1 shows cut-away side view of a stacked array magnifier 10 constructed according to the invention. The "stack" of FIG. 1 is made from two substrates 12 and 14 held together by a opto-mechanical fixture 16. Each of the substrates 12, 14 has at least one microlenslet array 18 disposed therewith. As illustrated, for example, substrate 12 provides two arrays 18a, 18b; while substrate 14 provides two arrays 18c, 18d. Each of the arrays 18 is made up of a plurality of microlenslets 20, the physical features of which are described in more detail below. Briefly, however, there are at least two types of lenslets 20 in the magnifier 10: refractive lenslets and non-refractive lenslets. As illustrated, for example, array 18a and array 18d are made up of refractive lenslets 20a and 20d, respectively. Array 18b and 18c, on the other hand, are made up of non-refractive lenslets 20b and 20c, respectively. Typically, the non-refractive lenslets are made up of diffractive gratings which include blazed grating microfeatures.

The magnifier 10 of the illustrated embodiment operates to form an image 22 of the object 24 along an optical axis 26 (note for purposes of illustration that the object "H" of FIG. 1 is shown sideways to the imaging axis when, in reality, it would need to face the magnifier 10 in order to be reimaged).

The lenslets 20 of the arrays 18 make up a plurality of channels 28 (for clarity of illustration, only two channels are illustrated with a dotted line indicating the optical path along the channel). In order to provide a magnification in the illustrated embodiment of FIG. 1, some of the channels are sloped relative to the optical axis 26 and between at least two of the arrays 18. By way of example, the slopes of the channels 28 between arrays 20b and 20c vary as a function of the channel's distance from the axis 26: the slope of channel 28a which is further from the optical axis 26—is greater than the slope of channel 28b, which is closer to the optical axis. Accordingly, the light radiation between the object 24 and image 22 is "spread out" to achieve the desired magnification.

The details of the magnification and imaging process, according to the invention, are described in more detail below. However, it should be apparent that each of the channels images points of the object 24 to points in the image 22. For example, channel 28b images point 30 of object 24 to point 32 in image 22; while channel 28a images point 34 of object 24 to point 36 in image 22. The spacing between lenslets 20 and the optical character of the lenslets along each channel determines the individual field of view of each channel 28. As will become more apparent below, the channel field of view can overlap with other channels to provide a continuous image, such as shown in FIG. 1.

Those skilled in the art should also appreciate that the imaging properties of the magnifier 10 permit a similar demagnification of objects by inverting the magnifier 10. If, for example, the image 22 is the "object," then the magnifier 10 will generate an "image" 24 which is a demagnified version of the "object."

Figure 1A:
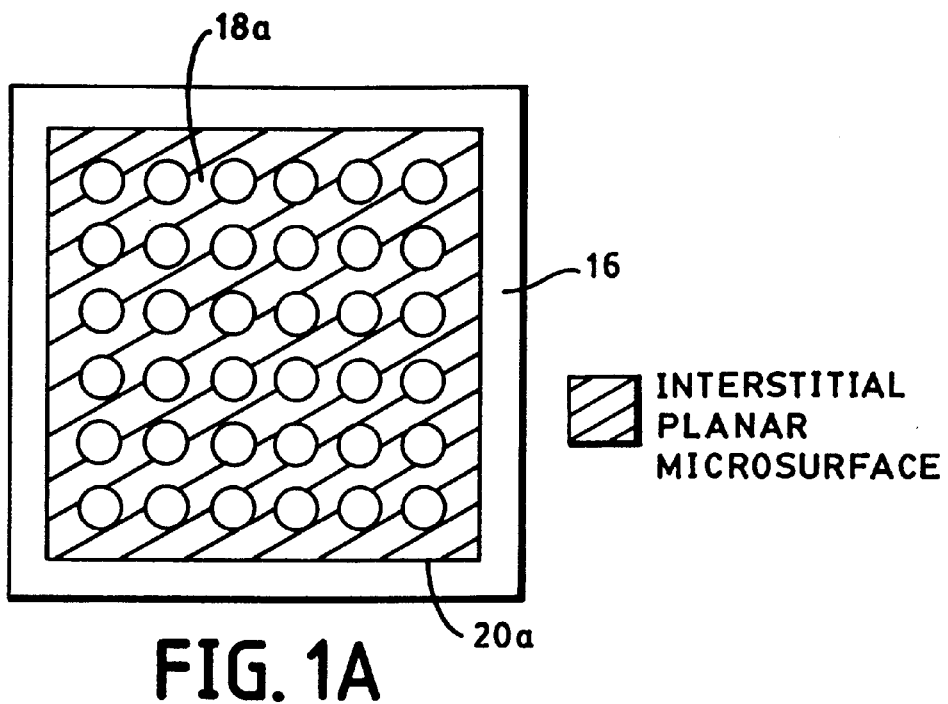
FIGS. 1A and 1B show, respectively, front and back views of the stacked array magnifier of FIG. 1.
Figure 1B:
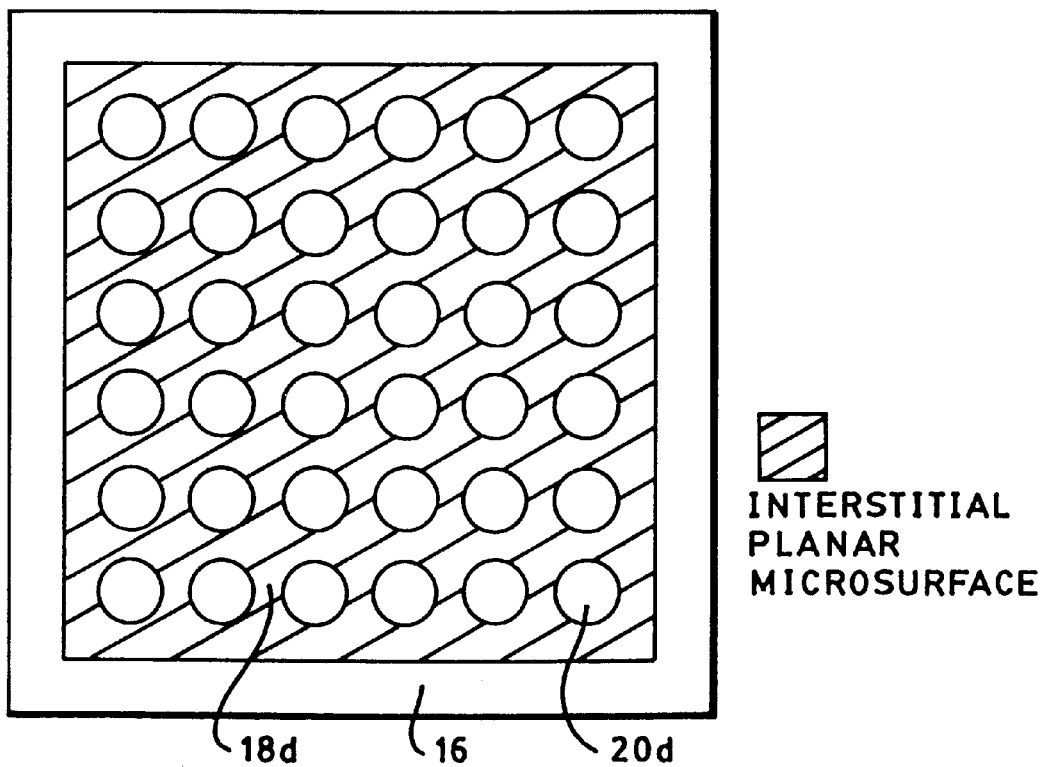

FIGS. 1A and 1B illustrate, respectively, front and back views (not to scale) of the magnifier 10. Specifically, FIG.

1A is a view of the magnifier 10 as viewed from the position of the object 24; while FIG. 1B is a view of the magnifier 10 as viewed from the position of the image 22. As easily seen, the spacing between the various lenslets 20 is greater within FIG. 1B as compared to the spacing between the lenslets of FIG. 1A, which is a result and a function of the desired magnification. Although not necessary, the lenslets 20a of array 18a are illustrated as being smaller than the lenslets 20d of array 18d in proportion to the magnification desired between the object 24 and image 22. Usually, and similar to conventional optical lens trains, lenslets of the several arrays are made with identical diameters to accommodate mechanical microfeatures. However, because channels can be tilted (as described herein), inadequate allowance in the interstitial spacing can result in crowding of lenslets at one of the surfaces. Accordingly, the design of a stack such as stack 10 should properly consider a balance of light collection or transfer efficiency (i.e., the maximum lens transmitting area or open area ratio through the arrays) while accommodating the lenslet channel spacing of all the arrays. By way of example, if the last surface—e.g., array 18d—has very small apertures spaced widely apart, then it is possible to accommodate a large magnification with close spacing of lenslets at the first surface—e.g., array 18a. However, the low open area ratio of the second surface will result in a low optical efficiency, similar to the effect of stopping down a conventional camera (which is good for high speed applications but only if there is good lighting, e.g., a flash lamp). Typically, the lenslet sizes are between about 5 µm and 1000 µm.

In FIGS. 1A and 1B, the area illustrated with diagonal lines (denoted in the figure as "interstitial planar microsurface) and between the several the lenslets 20 is generally planar and does not function to image radiation between the object 24 and image 22. Rather, the energy which impinges between lenslets 20 is preferably blocked so that such radiation does not reach the image plane (i.e., the plane at which image 22 resides). As described below, baffling, stops, masking and other optical techniques are used to prevent this unwanted radiation transfer. In one example, the interstitial planar surface is itself coated to be optically opaque to the desired radiation transmitted between the object 24 and image 22. In other examples, the opaqueness between lenslets can be fabricated by chemical modification of the lenslet array substrate material, by trench etching, and/or by thermal or other physical processing. Surface stops forming the opaqueness can also be fabricated using physical deposition, chemical modification, printing or other processes.

Stops such as a field stop or a Lyot stop can also be inserted at or near to an internal image to reduce cross-talk or other stray radiation that might scatter from various surfaces or which might transmit through the interstitial surfaces. With further reference to FIG. 1, for example, the stops 25 are arranged at an intermediate image plane 27 within the stack (note that at least one intermediate image is required to achieve an upright image 22). Those skilled in the art will appreciate that the purpose of a field stop, generally, is to restrict the field of view; while a Lyot stop is used generally to limit the transmission of unwanted diffraction effects. These inter-lenslet stops 25 can include a metal or other opaque mask which also provide for accurate spacing and precision as to the location of adjacent arrays 18 in the stack. They further can be arranged into a single structure such as a flat metal disc that is mounted to within the fixture 16 via a male/female connection 29 into the fixture 16. Note, for clarity of illustration, that only two stops 25 are shown when it is intended that many or most of the channels 28 have corresponding stops 25 located at the image plane 27.

Figure 2:
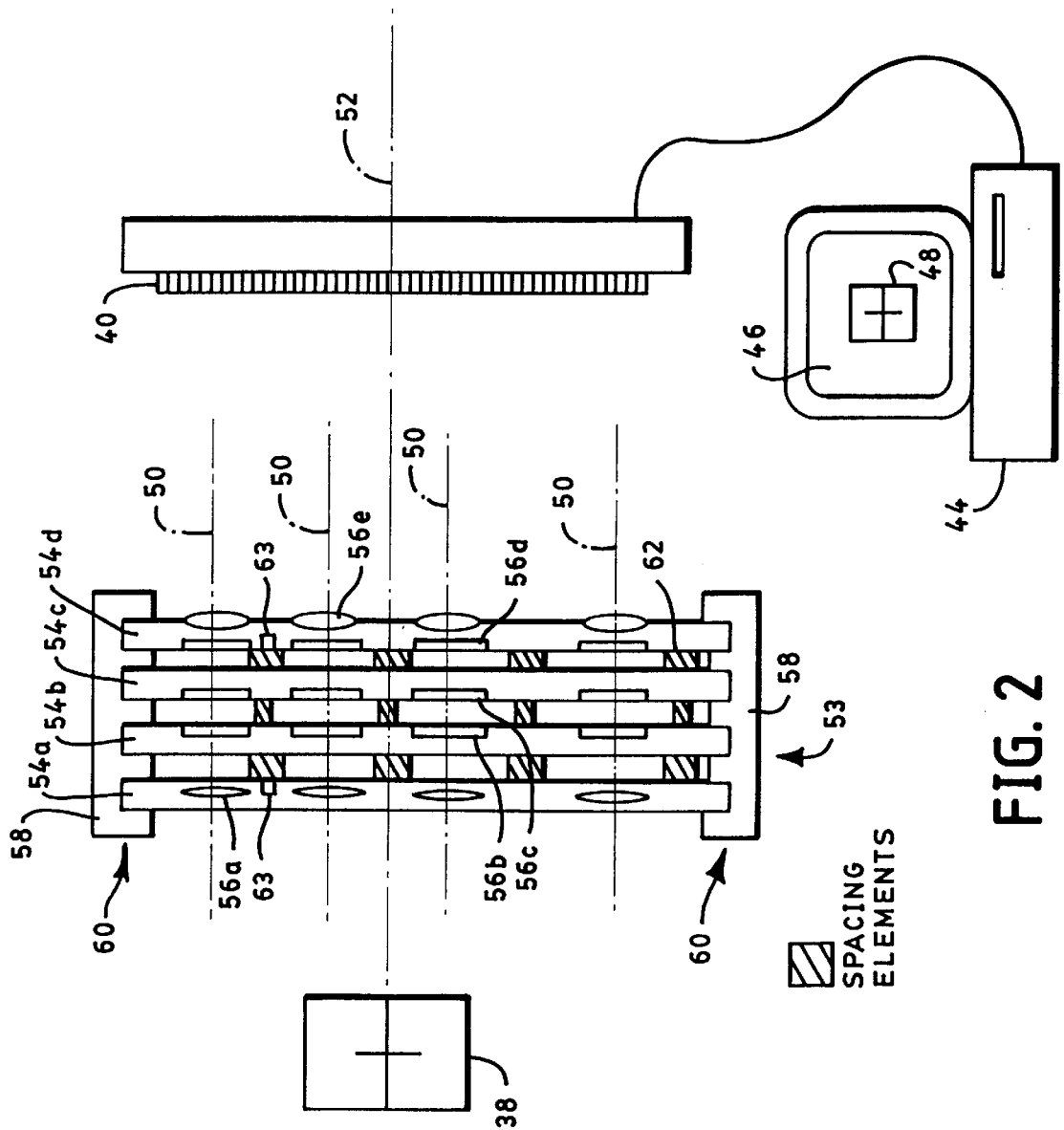
FIG. 2 shows a system constructed according to the invention and which includes a five array stack for imaging an object onto a CCD array.

Generally, at least four arrays of lenslets and at least two substrates are used to form a stack according to the invention. FIG. 2, for example, illustrates one simple use of the invention: a four substrate stack of five arrays imaging an object 38 onto a solid state device such as a CCD array 40. CCD electronics 42 and known to those skilled in the art transfers the charge data from the CCD array 40 to a computer 44 with a display screen 46 so that the object's image 48 is viewable on the screen 46. In this illustration, all of the channels 50 are substantially parallel to the optical axis 52 such that unit magnification is achieved (i.e., unit magnification means a magnification of "1").

With further reference to FIG. 2, a stack 53 is made of four substrates 54a–54d that each have one or more arrays of lenslets 56 added thereto (note, for clarity of illustration, that only four lenslets are shown per array while in reality many lenslets exist for each array). Substrate 54a has one array disposed internally to the substrate material, which is typically made from semiconductor material, glass, single crystal, polycrystalline, liquid crystal, polymer or other optically transmissive material amenable to processing into microlenslet arrays. In one example, the lenslet 56a of the array within substrate 54a is made through ion doping to achieve a refractive effect, such as discussed in connection with FIGS. 11 and 12. Substrate 54b and substrate 54c each provide an array of non-refractive lenslets 56b and 56c, respectively, that are made onto the surfaces of the substrates 54a, 54b. Substrate 54d has two arrays formed onto each of its surfaces: an array of non-refractive lenslets 56d on one surface of the substrate 54d and an array of refractive lenslets formed onto the other surface of the substrate 54d.

FIG. 2 also illustrates other methods of mechanically holding the substrates 54 and arrays lenslets 56 into the stack 53. Like in FIG. 1, one method for holding the arrays together is with an opto-mechanical fixturing 58 attached to the edges 60 of the substrate arrays 54. However, the arrays can also be separated by spacing elements 62. In one embodiment of the invention, fiducial marks 63 are made onto one or more of the surfaces (through deposition or other methods known to those skilled in the art of microlenslet manufacture) so that the elements 62 can be properly placed between the interstitial spacing between the lenslets. Such spacing elements 62 can further support the accurate coregistration of adjacent arrays, such as illustrated in FIGS. 2A and 2B.

Figure 2A:
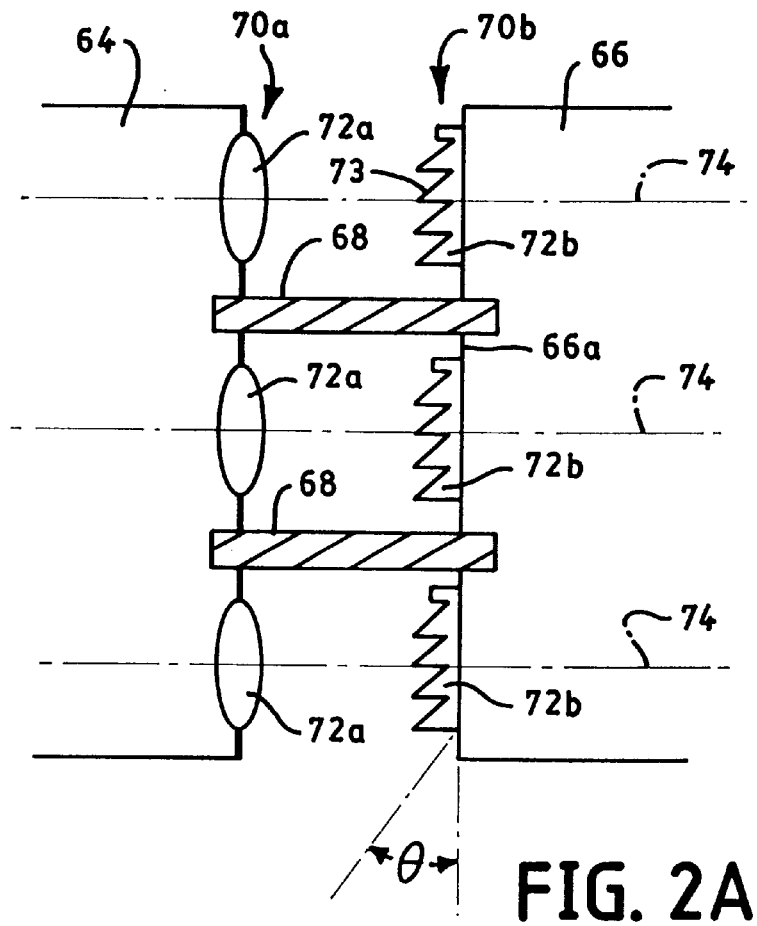
FIGS. 2A and 2B illustrate representative techniques of the invention used to separate adjacent arrays to obtain selected separation distances as well as coregistration.
Figure 2B:
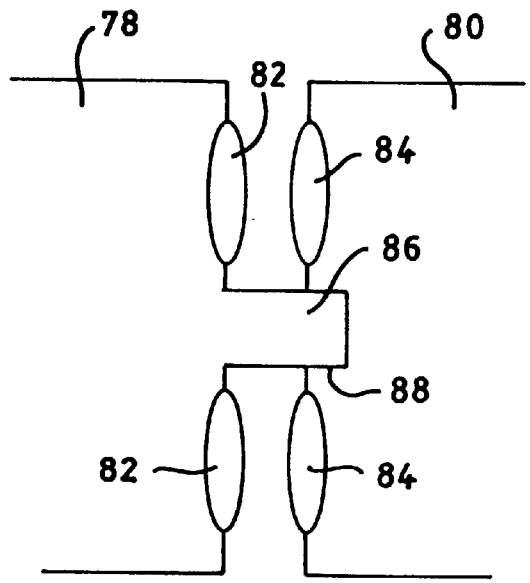

FIG. 2A illustrates portions of two substrates 64 and 66 separated by spacing elements 68. Not only do the spacing elements 68 provide proper distancing between the arrays 70a, 70b, formed by the lenslets 72a, 72b, respectively; but they also provide for proper coregistration between lenslets 72 within any given channel 74 since the female etch patterns 76 are accurately applied to the substrates 64, 66 prior to assembly of the stack.

FIG. 2A also illustrates one non-refractive lenslet 72b constructed according to the invention. The lenslets 72b are microelements which form an array of blazed gratings. Those skilled in the art should appreciate that blaze gratings have angled grating grooves 73 that are optimized, in angle and as a function of wavelength, so as to diffract light energy into highly efficient orders and in the direction of choice. The grooves 73 can be tilted at an angle θ, for example relative to the substrate surface 66a, so as to achieve the desired optical energy transfer. Representative designs according to the invention are described in more detail below.

The combination of a non-refractive lenslet 72a and non-refractive lenslet 72b in a stack is sometimes denoted herein as a "hybrid" lenslet array. In particular, a stack of different lenslet arrays is a hybridization between refractive and non-refractive lenslets to achieve improved optical properties such as reduced color or other optical aberrations, enhanced throughput efficiency, high resolution or MTF, and field uniformity.

FIG. 2B illustrates yet another embodiment of aligning adjacent arrays in a stack. In particular, FIG. 2B shows partial substrates 78, 80 with partial arrays of lenslets 82, 84 spaced apart by male and female etch patterns 86, 88, respectively, formed into the substrate surfaces. Note that in FIG. 2B the two adjacent arrays of lenslets are all refractive elements, which is yet another reasonable and expected lenslet configuration according to the invention.

Figure 3:
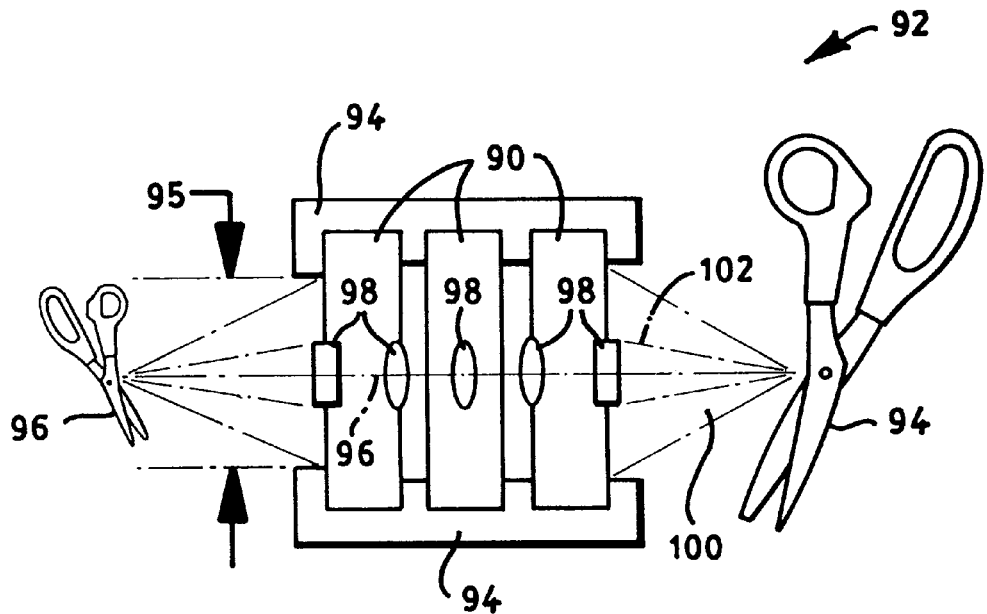
FIG. 3 illustrates multiplicative magnifications achieved through a plurality of magnifying stacks constructed according to the invention.

FIG. 3 shows a sequence of three stacks 90 arranged into an optical system 92 to provide a magnified image 94 of an object 96. By way of example, each of the stacks 90 can be made similar to the magnifier stack 10 of FIG. 1. Typically, a stack according to the invention provides at most an 8:1 magnification ratio. However, stacks can be arranged in sequence to boost the overall magnification significantly, such as shown in FIG. 3. If, for example, each of the stacks 90 provides a magnification of 2:1, then the sequence of stacks 90 of FIG. 3 provides a magnification of $2^3$, for a total magnification of 8:1 for the system 92. As above, one technique for keeping the array of stacks together is through an opto-mechanical end piece 94. However, inter-stack spacers 96 can also be used alone or in conjunction with the piece 94. The spacers 96 can be made similarly to the spacers 62 of FIG. 2, and including the various arrangements set forth in FIGS. 2A and 2B. Like above, the achievement of precise coregistration between lenslet arrays is advantageous in improving image quality and processing capability.

It is not necessary, however, that each of the stacks 90 of FIG. 3 have the same magnification. Rather, stacks of different magnification can be arranged in sequence to provide a multiplying magnification effect. In addition, magnification limitations of 8:1 are dependent upon many practical factors relating to lenslet spacing, open area ratios, lenslet powers, and other fabrication and assembly issues. Those skilled in the art should appreciate that the 8:1 ratio will increase with improvements of microlithography, lenslet processing, and micromachining and microalignment.

One clear advantage of the system 92 of FIG. 3 is that each of the stacks 90 can be made separately and similarly along a common production line, thereby simplifying the complexity of the overall system 92, improving production yields, and reducing non-recurring costs needed to tool-up for the desired opto-mechanical configurations.

FIG. 3 also shows the f-number differences between the overall system 92 and an individual channel 96. Note for clarity of illustration that only one channel 96 is illustrated, with associated lenslets 98; while in reality there are many similar channels arranged throughout the stacks 90. In addition, the lenslets 98 are grossly oversized in comparison with reality, also for clarity of illustration. It is clear with reference to FIG. 3 that the overall f-number of the system 92, illustrated by the cone angle 100, is less than the f-number of the channel 96, as indicated by the cone angle 102. Accordingly, the f-number of the channels 96 is less than the f-number of the system 92. Those skilled in the art should appreciate that an f-number of about f/1 is desirable in view of energy throughput; and therefore many systems strive for similar low f-numbers. As a result, individual channel f-numbers are typically greater than about f/1.

Figure 4:
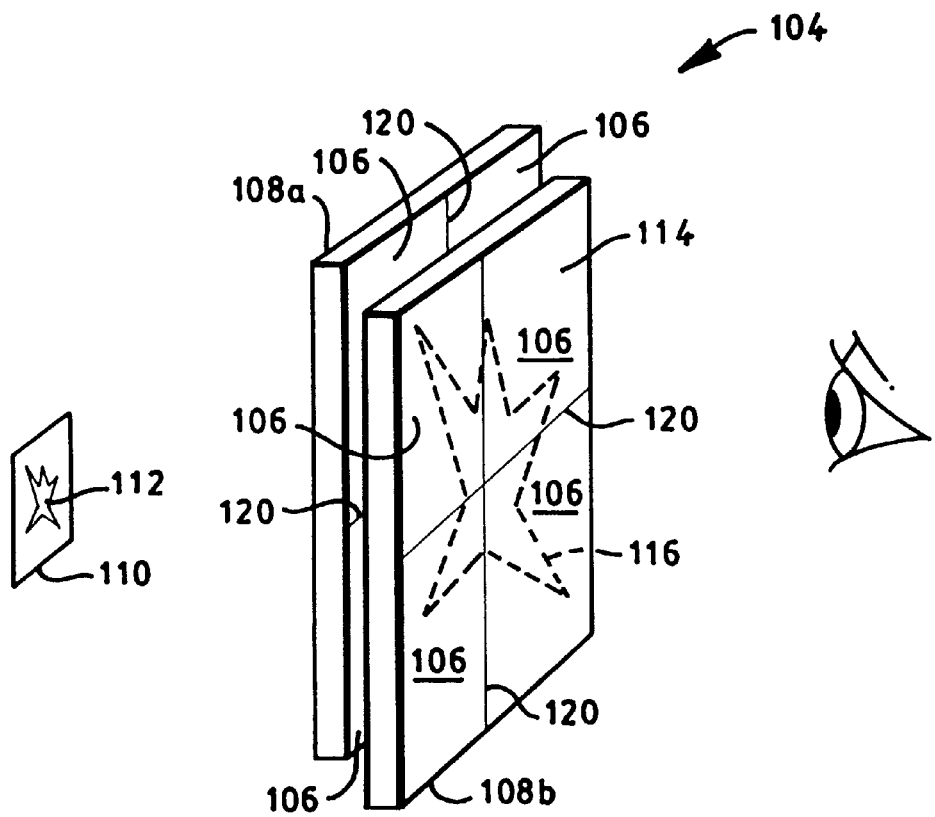
FIG. 4 illustrates an arrangement of stacks formed into a tile to provide a large format display according to the invention.

FIG. 4 shows a perspective view of an imaging system 104 made from tiled array of stacks 106 that are formed together into a two functional stacks 108a, 108b. It is sometimes difficult to manufacture a single stack at desired large physical dimensions. Accordingly, stacks can be tiled together to the desired display format. As above, they can also provide selected magnification to achieve the desired display size and characteristics. By way of example, a stack of the invention can be used to provide a large format display of a miniature FPD 110. The miniature FPDs of the prior art have very high quality and resolution; but they are too small for comfortable viewing. Thus, even though the object 112 on the FPD 110 is good; it is too small for viewing by an audience spaced away from the display 110. Accordingly, the system 104 reimages the display 110 (and particularly the object 112 on the display 110) to the front 114 of the system 104 (see the image 116 of the object 112). In this manner, a user (here shown as a human eye 118) can comfortably view the image 116 as opposed to the object 112 on the FPD 110.

Because the lenslets (not shown) of each of the stacks 106 are so small and because they extend substantially to the edge of each stack, the junctures 120 between the separate stacks are substantially invisible to the user 118. That is, the lenslets can provide substantially 100% fill factor of the physical size of the stack; and therefore the joinder of two or more stacks in a tile—such as illustrated in FIG. 4—is practically invisible or "frameless." Accordingly, the tiling process described in FIG. 4 is scaleable to the desired physical configuration of the overall display 104. In the case of massively parallel processing, the tiled stacks are arranged in a pattern that is adequate to accommodate the data being processed.

Irregardless of the fill factor, each of the channels passing through the stacks 106 has a selected field of view (FOV). If desired, the FOV of each channel can be overlapping with at least one other channel so that a continuous image is obtainable. This overlapping FOV additionally helps mask the junctures 120 from the user 118. The overlapping FOV effect is sometimes referred to herein as "image interlacing" whereby each point on the object is reimaged by a plurality of channels so as to ensure a continuous image, such as shown in FIG. 1.

Because the arrays of the invention can have very high fill factors relative to the physical dimension of the stack, it is typically the mechanical support structure which limits the overall aperture of the stack. By way of example, and with reference to FIG. 3, it is generally the clear aperture 95 of the structure 94 which limits the aperture of the system 92 and not the combined FOV of the lenslet arrays with the substrates.

Figure 5:
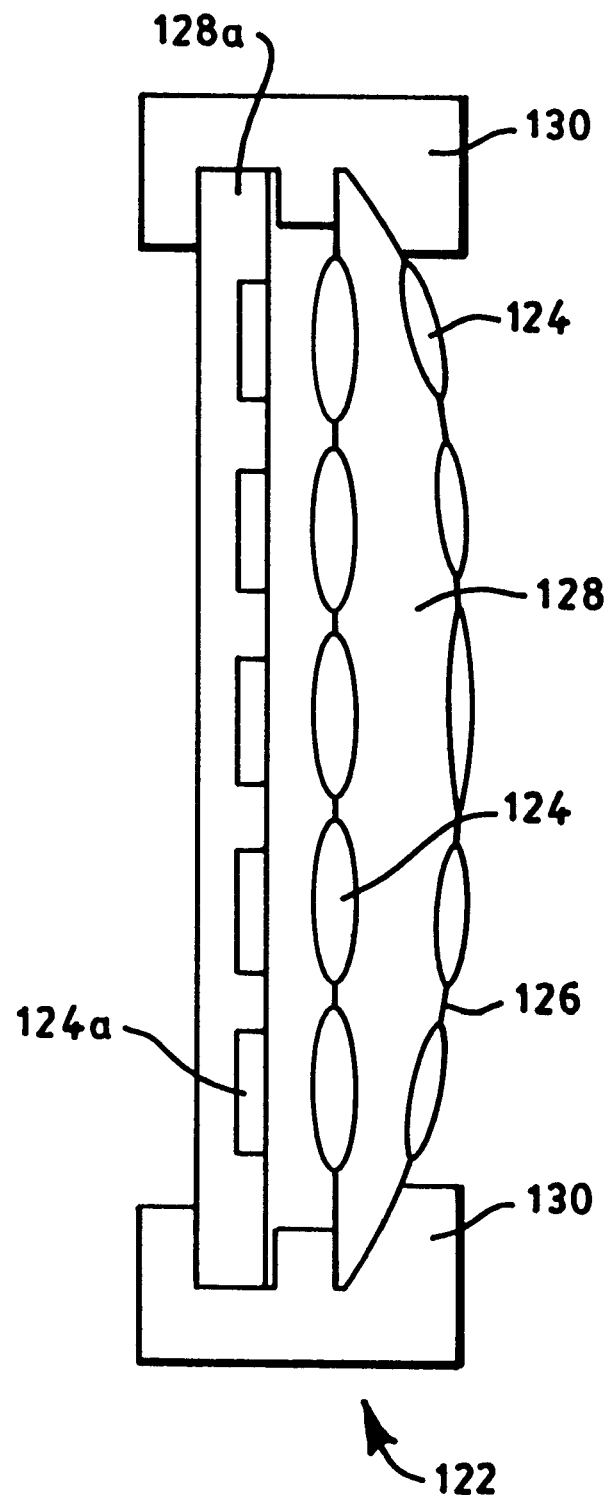
FIG. 5 illustrates one stack constructed according to the invention and which includes both microlenslets and macrolenslet structure.

FIG. 5 shows one embodiment of the invention wherein a stack 122 constructed according to the invention includes both arrays of microlenslets 124, at least one macrolens surface 126, and one or more substrates 128. Opto-mechanical fixturing 130 supports the stack and holds the arrays in alignment. The purpose of the macrolens surface 126 is to provide continuous and relatively large optical power to radiation passing therethrough so as to achieve a desired optical result. Lenslets 124 can be made with the macrolens surface 126, as shown, or the macrolens can be free-standing and without lenslets therewith. In at least one of the arrays of lenslets 124 is non-refractive in nature, such as illustrated by the lenslets 124a on the substrate 128a. Accordingly, the microlenslets 124 of FIG. 5 generally have a first purpose directed at microimaging features of the radiation transfer; while the macrolens 126 has a second purpose directed at macroimaging features of the radiation transfer.

Figure 6A:
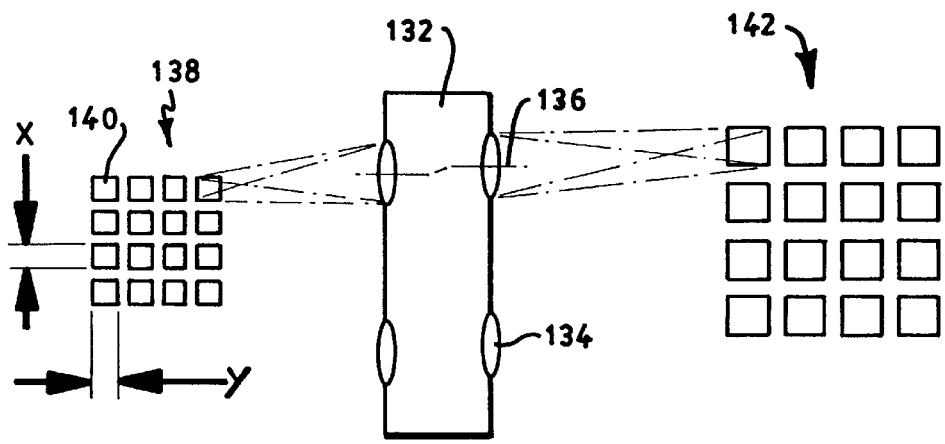
FIGS. 6A–6B illustrate selected types of imaging according to the invention, including continuous and pixelated imaging.
Figure 6B:
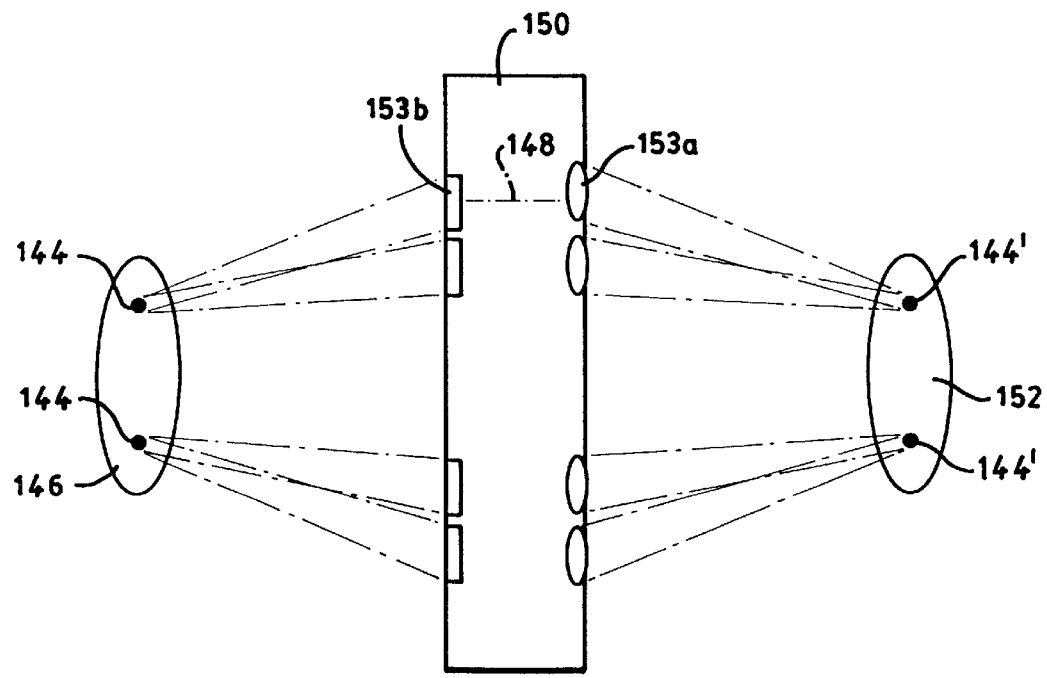

FIGS. 6A–6B illustrate various types of imaging achievable with a system constructed according to the invention. In FIG. 6A, a stack 132 is constructed with arrays of microlenslets 134 and channels 136, such as described above (note, as before, that only a few of the microlenslets 134 and channels 136 are shown for clarity of illustration). The object in this figure is a pixelated object array 138 such as a computer display screen, containing a plurality of light emitting pixels 140. Even though the entire stack 132 operates to provide an image 142 (here shown with slight magnification, though not required) of the array 138, each individual channel's FOV is limited to the pixelated dimensions of the computer display pixels 140 such that there is a one-to-one correspondence between lenslets 134 and pixels 140; and that there is no overlapping between channels 136 so that no two channels 136 reimage the same pixel to the image 142.

The arrangement of FIG. 6A is useful for example when it is important to restrict the cross-talk between adjacent pixels. As shown, the image 142 is easily converted to electrical signals by a CCD array since the image 142 is also pixelated, magnified, and discrete with a one-to-one correspondence with the pixels 140.

Those skilled in the art should appreciate that the FOV of each channel can thus be arranged to cover less than the x, y pixel dimensions of the array 138. This might be used, for example, to greatly limit the effects of cross-talk and scatter between adjacent channels and to compensate for diffraction effects.

FIG. 6B, on the other hand, illustrates image interlacing such that each point 144 on the object 146 is reimaged to corresponding points 144' at the image 152 by at least two channels 148 of the stack 150. For clarity of illustration, only two channels 148 are shown in the stack 150, each channel having at least one refractive lenslet 153a and at least one non-refractive lenslet 153b; and only two channels 148 are shown to reimage each point 144 of the object 146 to the image 152. Typically, many more channels 148 reimage each point 144 in the object 146. In this manner, the image 152 is "interlaced" with microlenslet reimaging from many channels 148, thereby ensuring that there are no gaps in the image, even if a channel 148 is damaged or inoperative.

Figure 7A:
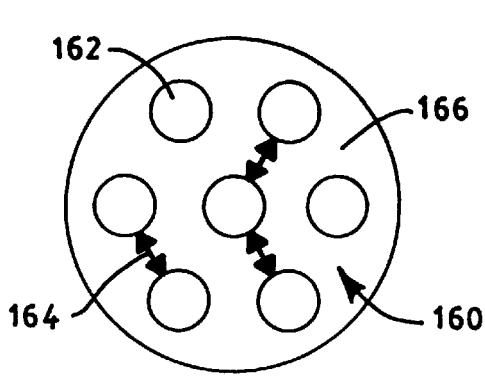
FIGS. 7–7E illustrate selected options of arranging microlenslet patterns in an array, according to the invention.
Figure 7B:
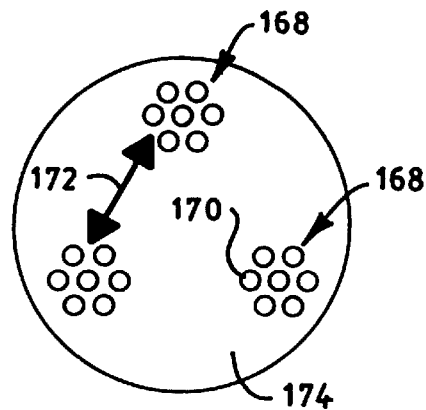
Figure 7C:
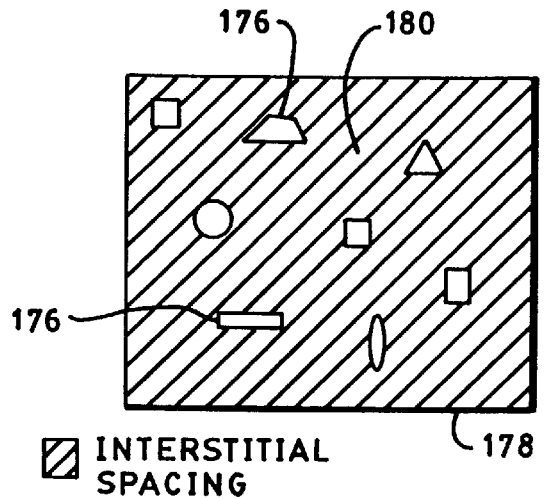
Figure 7D:
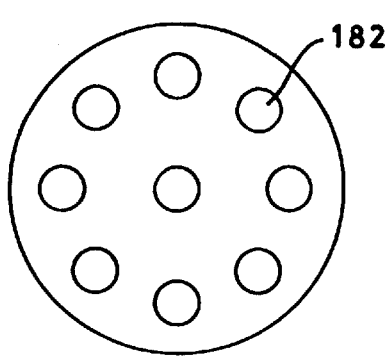
Figure 7E:
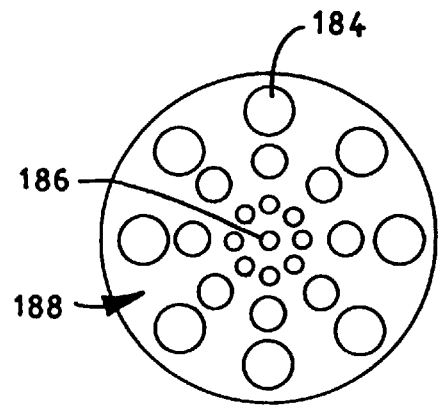

FIGS. 7A–E illustrate various arrangements of lenslets within a lenslet array such as described herein. For purposes of illustration, the arrays of FIGS. 7A–7E are shown from a view that is substantially perpendicular to the face of the array, such as along the optical axis 26 of FIG. 1. Briefly, FIG. 7A shows an array 160 of lenslets 162 arranged at regularly spaced—e.g., Cartesian—intervals 164 along the array surface 166. FIG. 7B similarly shows a kernel array 168 of lenslets 170 with selected distances 172 between lenslet kernels 168 (i.e., a kernel in this instance refers to a sub-array pattern that is repeated throughout the array in a similar or different pattern). The arrangement of FIG. 7B is useful, for example, in providing multiple imaging systems on a common array substrate 174. FIG. 7C shows an array of lenslets 176 that are irregularly spaced from each other in unique or semi-unique form along the array surface 178. Note that FIG. 7C also illustrates that lenslets can have varying shapes, according to the invention, such as circular, hexagonal, square, triangular, trapezoidal, and rectangular. As above, the interstitial spacing 180 between lenslets 176 are opaquely covered or stopped via optical techniques, so as to reduce or eliminate radiation transfer through the regions 180. Note also that the shape of the array substrates are a matter of design choice, such as circular as in the substrate 166, 174 of FIGS. 7A and 7B, and rectangular as in the substrate 178 of FIG. 7C, so as to fit with a selected opto-mechanical assembly or system. FIG. 7D illustrates an array of lenslets 182 that are arranged in a radial fashion; while FIG. 7E illustrates lenslets 184 that are arranged with varying distances from the center 186 of the array 188. The configuration of FIG. 7E is one used often, in accord with the invention, to achieve selected magnification in an image, similar to the technique shown in FIG. 1, so that a given channel can spread outwards relative to the optical axis. Note in FIG. 1 that while the lenslets 56 extend in varying distances from the axis 26, the pattern need not be radial such as shown in FIG. 7E.

Those skilled in the art should appreciate that the lenslet sizes, and the number of lenslets, within the arrays of FIGS. 7A–7E are shown for illustrative purposes and are not to scale. In reality, the lenslets of these figures are much smaller as compared to the substrate size; and there are typically many thousands of lenslets within a given array.

Figure 8:
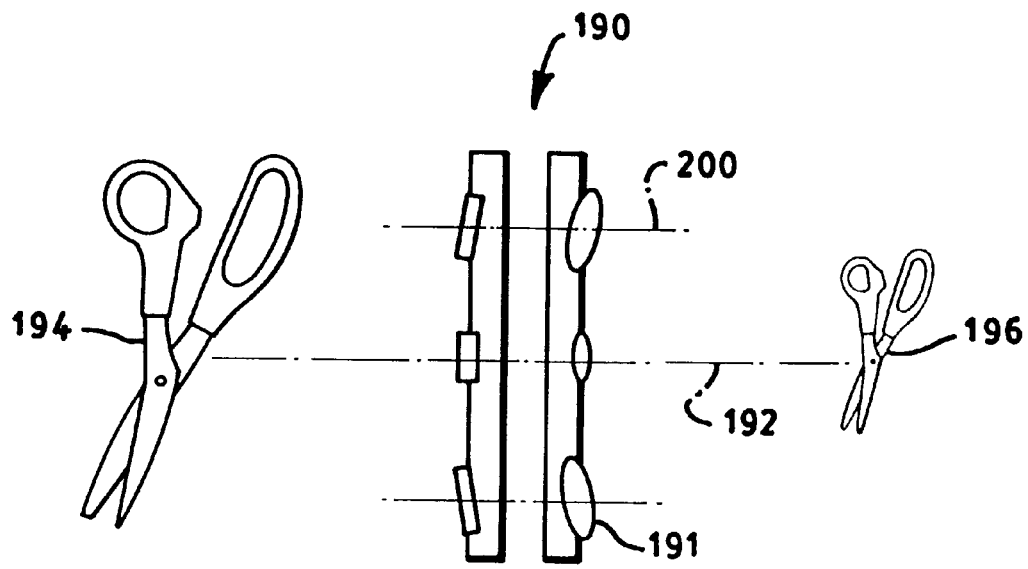
FIGS. 8 and 8A show other techniques of imaging an object with magnification, according to the invention, and with tilted lenslets or lenslets with varying optical power within the stack arrays.

FIG. 8 illustrates a stack 190 with microlenslets 191 arranged in a tilted manner, relative to the optical axis 192 between the object 194 and the image 196, so as to achieve selected demagnification. The effect is similar to FIG. 1 except that the lenslets 191 themselves are tilted relative to the axis 192; while the channels. 200 are substantially parallel to the axis 192. This tilting of lenslets inwards and outwards provides for selected magnification of the stack 190. However, problems associated with tilting lenslets as in FIG. 8A include fabrication and process limitations. Diffractive steering lenslets generally operate better. Nevertheless, diffractive surfaces can be micromachined (or processed) so as to "blaze" the overall array surface so as to produce macroscopic Fresnel-like surface kineforms and to provide tilted substrate regions prior to lenslet formation. This facilitates the tilting of lenslets as in FIG. 8A. Note also that tilted lenslets and sloped lenslet channels can be combined together in a stack to achieve other varying effects such as magnification.

Figure 8A:
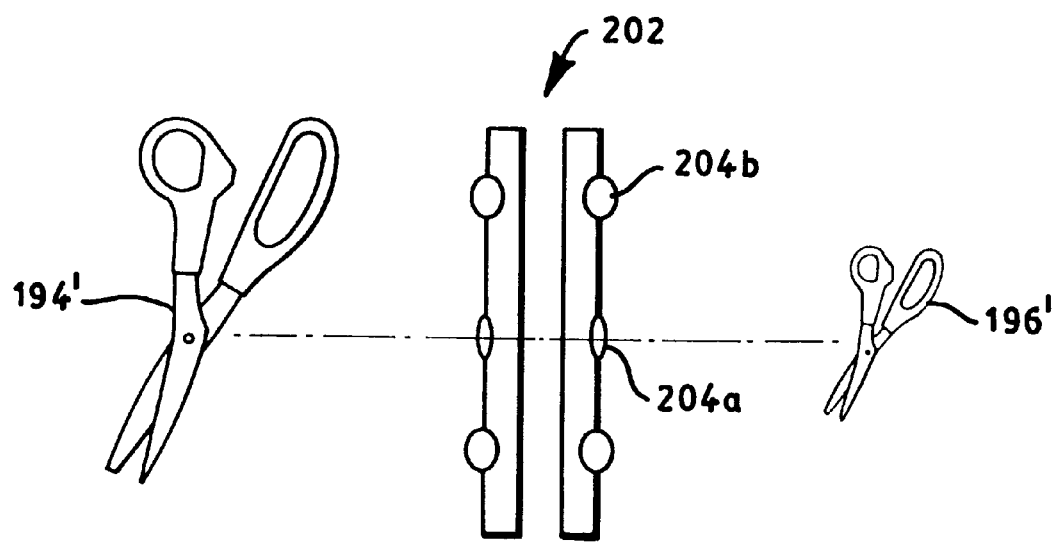

In an alternative configuration, and as shown in FIG. 8A, a stack 202 can provide selected magnification by utilizing lenslets 204 with differing optical powers: the inner lenslets 204a of the stack 202, i.e., those lenslets closer to the optical axis 206, have a lower optical power as compared to the lenslets 204b which are further from the optical axis 206. Additionally, diffractive lenslets can be used to enhance this effect. Note, however, that the main issue addressed with varying optical powers and aperture sizes (including apodization, described herein), is aberration control; while luminance variations (created, for example, by cosine^4 losses) are addressed by tilting as in FIG. 8A. Accordingly, by changing lenslet power, aperture sizes, apodization, and other parameters discussed herein, optical efficiency can be compensated and corrected as a function of the distance from the optical axis to the edge of the respective arrays.

Figure 9:
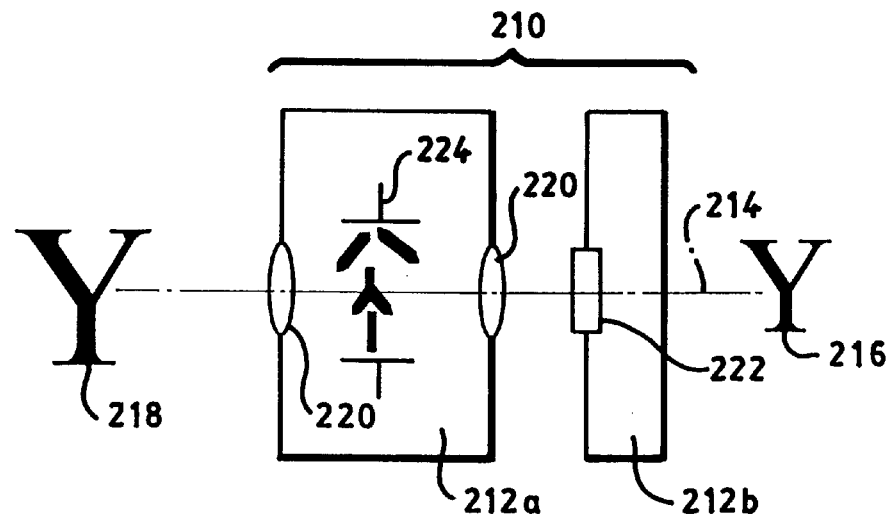
FIGS. 9 and 9A show a sequence of stacks providing a relay of images to achieve erect or inverted images, selectively, and to stop the internal images so as to improve image quality.

FIG. 9 shows a sequence 210 of stacks 212 arranged along an optical axis 214 so as to provide an erect image 216 of the object 218. As illustrated, the stack 212a has two arrays of refractive lenslets disposed therewith (shown illustratively as two lenslets 220); while stack 212b has an array of non-refractive lenslets (shown illustratively as a single lenslet 222). This design provides an internal, inverted image 223 of the object 218 within the first stack 212a so that the final image 216 is erect. Generally, therefore, 2n+1 internal images are required to generate an erect image, where n is an integer 0,1,2,3, . . . . FIG. 9 also shows in internal stop 224 arranged within the stack 212a so as to limit the field of view and to restrict the transfer of unwanted radiation (e.g., scattered radiation) to the image 216, thereby boosting MTF.

The stop 224 can, for example, be micromachined internal to the stack 212a, electro-formed or inserted as a separate element.

Figure 9A:
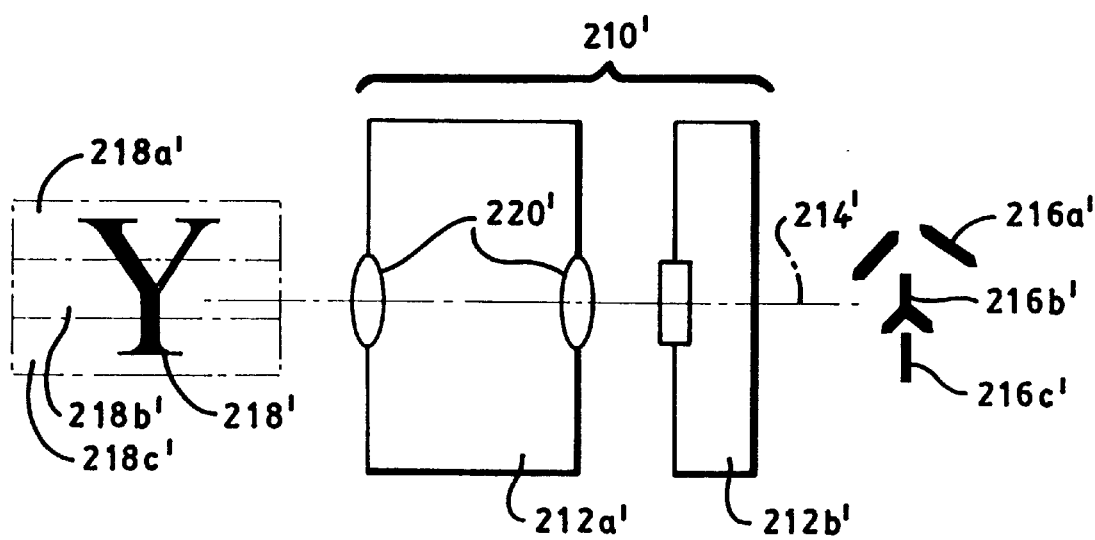

Similar to FIG. 9, FIG. 9A shows a sequence of stacks 210' arranged along an axis 214' to provide an inverted image 216' of the object 218'. In this configuration, the refractive elements 220' do not generate an internal image; and hence the final image is inverted. Generally, 2n internal images within a sequence of stacks will provide a non-erect image, where n is an integer 0,1,2, . . . . Note that if the stacks do not generate a continuous and erect image, the resulting image 216a'–216c' is jumbled relative to its original appearance since each channel images and inverts a separate FOV, shown illustratively by the dotted sections 218a'–218c' (such as the internal image 223 of FIG. 9).

As discussed above, microlenslet surface structures can take on many forms, including: (a) refractive optical elements, (b) diffractive kineforms, (c) high order, high efficiency diffractive steering or focusing lenslets, (d) holograms or holographic lenslets, (e) computer generated holograms, (f) effective index modulating surface arrays, (g) apodizing or other spatial filters, or (h) other features typically generated by lithographic and semiconductor fabrication technology. FIGS. 10–14 illustrate exemplary microlenslets and optical effects created by certain of these lenlset forms.

In particular, FIGS. 10A–10C illustrate, respectively, the construction of a holographic lenslet array, a resulting holographic lenslet, and the overall holographic array lenslet operation. In FIG. 10A, a content beam 230 and a reference beam 232 (both typically electromagnetic laser sources such as known to those skilled in the art of holography) interfere within a substrate 234 which reacts (such as with emulsion) to form holographic lenslets 236 (shown illustratively as an interference pattern), FIG. 10B. In operation, FIG. 10C, an object 238 which generates a light beam 240 that interacts with the lenslet is "steered" off at the sensitivity angle θ.

FIGS. 11A and 11B illustrate, respectively, construction of phase modulation lenslets and the overall operation of phase modulation lenslets. In FIG. 11A, a substrate 242 is modified with phase-changing radiation or deposition 244 so that the phase angle φ of the incident electromagnetic field, E, is transformed to E* by an amount such as ninety degrees, FIG. 11B.

FIG. 12A illustrates the manufacture of an index modulating lenslet by ion implantation or exchange. In the illustrated example, the radiation 246 incident on the radiation sensitive substrate 248 is in the form of a Gaussian beam so as to effect either a gradient index lenslet 250, FIG. 12B, or a Gaussian-shaped index modulation lenslet 252, FIG. 12C (note that the shape of lenslet 252 is easily modified to another form by changing the shape of the input beam, e.g., to a Bessel irradiance profile). In an alternative index modulating lenslet configuration, FIG. 12D shows a substrate 254 that incorporates a series of nanometer wide cuts 256 that are much smaller than the wavelength of operation. These cuts operate to decrease the density of the substrate and to reduce the effective optical index (i.e., air is about 1.0).

Lenslets according to the invention are preferably made with lithographic processes. By way of example, a sequence of photomasks are generated with features that correspond to the desired lenslet dimensions. The substrates are then coated with photoresist. Using a photomask, the resist is then exposed to the sensitizing radiation (typically ultraviolet, electron, or x-ray) followed by curing. The cured and uncured resist are then coated with a metal or other masking material; and the uncured polymer and metal coatings are removed to expose regions of bare substrate. The exposed areas of substrate are then etched using plasma, wet chemical, reactive ions, or other techniques to create a relief pattern. This process is thereafter repeated for successive photomasks to generate a three-dimensional relief structure corresponding to the desired refractive or diffractive lenslet.

Figure 13A:
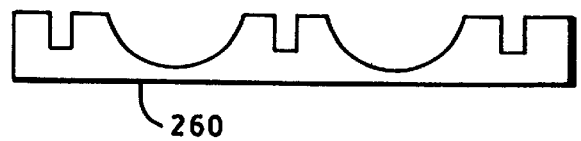
FIGS. 13A and 13B illustrate, respectively, a negative mold and a lenslet array made from the mold, in accord with the invention.
Figure 13B:
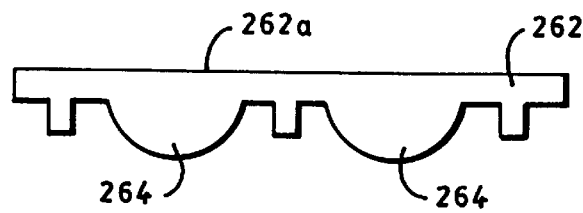

The making of a negative mold for use in polymer or sol gel molding or replication further illustrates useful lithographic processes in accord with the invention. By way of example, and with reference to FIGS. 13A and 13B, negative lenslet features are first molded into a metal master mold 260; and this mold is used to form a substrate 262 with integral lenslets 264 by conventional processes, e.g., injection molding, die pressing, and stamping, known to those skilled in the art. Certain replication techniques, according to the invention, utilize a negative mold as above, and without heating. The mold 260 is coated with a release agent, and followed by the lenslet material 262 in the form of an epoxy, polymer or sol gel. The lenslets features are transferred to a bulk substrate, such as a glass plate, using an adhesive, thermoset or other bonding agent. With reference to FIG. 13B, the flat side 262a, for example, is bonded to such a substrate.

Figure 14A:
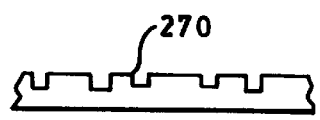
FIGS. 14A and 14B illustrate lenslet structures made from diffractive kineforms.
Figure 14B:
Figure 15A:
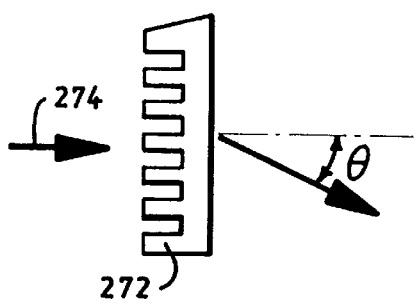
FIGS. 15A–15G illustrate different lenslet constructions according to the invention.
Figure 15B:
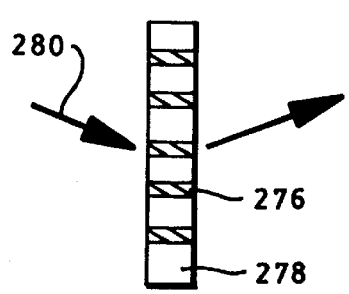
Figure 15C:
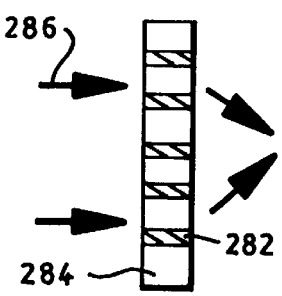

FIGS. 14A and 14B illustrate arrays of lenslets 270 formed by diffractive kineforms. FIG. 15A shows a diffractive beam steering lenslet array 272 that redirects a wavefront 274 (of the wavelength corresponding to the microfeatures in the lenslet array 172) at an angle θ (note that such an array can also be a focusing lenslet array). FIG. 15B similarly shows a holographic array of lenslets 276 (or phase or index modulating array) disposed into a substrate 278 to effect beam steering of an incoming wavefront 280. A computer generated hologram lenslet array 282 within a substrate 284 provides similar effect to provide focusing of an incident wavefront 286, such as shown in FIG. 15C.

Figure 15D:
Figure 15E:
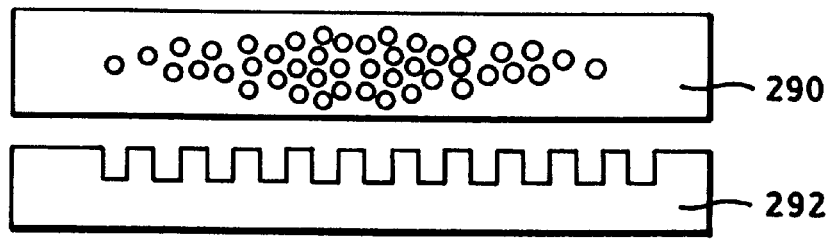
Figure 15F:
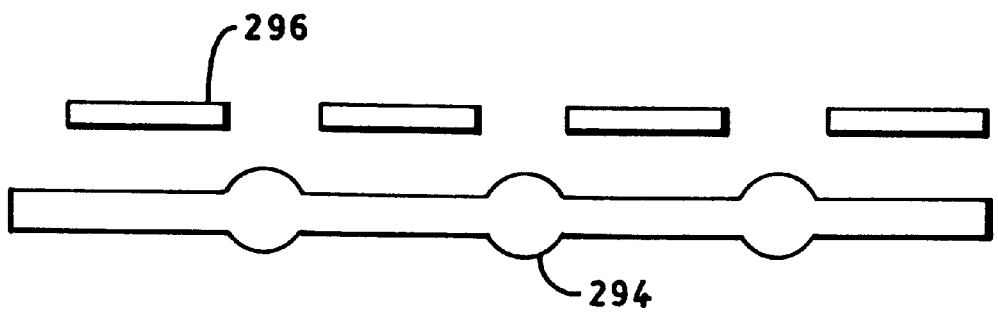
Figure 15G:
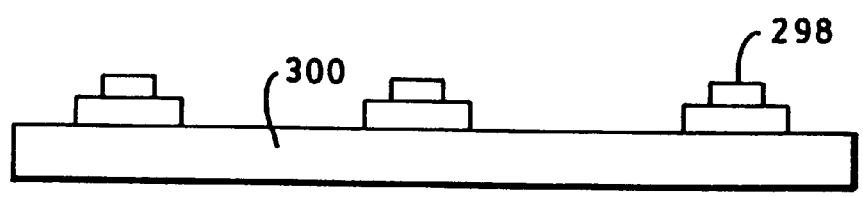

FIG. 15D illustrates an array of gradient index (GRIN) lenslets 288 formed by ion implantation, back fill with polymer or gel, or ion exchange as in conventional GRIN elements. FIG. 15E shows an apodization filter 290 that has a selected transmission function (e.g., Gaussian or anti-Gaussian) and used in conjunction with a kineform lenslet array 292 to effect certain desired transfer characteristics, such as uniformity of illuminance (e.g., cosine-to-the-fourth losses, and modification of Gaussian laser beams). FIG. 15F shows a refractive lenslet array 294 formed in conjunction with an array of stops 296 to effect characteristics such as FOV and luminance uniformity. Within a given array, the stops 296 can include apertures of different diameters so as to (a) be consistent with the lenslet channel diameter or so as to (b) balance illuminance uniformity from the center to the edge of the array. The effect of (b) occurs because lenslets in the center of the array will transmit at greater efficiency as compared to lenslets at the edge of the array unless the lenslet channels at the edge are a different lens configuration or have larger clear apertures. Lenslets can also be formed through lithographic deposition of material for refraction or phase modulation (or retardation), such as shown by the lenslets 298 deposited onto the substrate 300, FIG. 15G.

FIGS. 16A–16E illustrate the impact of lenslet FOV on imaging characteristics. The FOV becomes a practical design and fabrication issue due to the relationship between lenslet SAG and curvature given the state-of-the-art fabrication capabilities (that is, the FOV is effectively limited in lenslets with high power—typically small lenslets—since the image at wide field angles is blurred and practically non-existent). If the SAG is less than curvature, then lenslets are, generally, easier to fabricate. In FIG. 16A, an array of lenslets 302 are arranged adjacent to a RGB (red, green, blue) pixelated object 304 such as a color matrix display. In FIG. 16A, the lenslet clear apertures are clearly smaller than the pixelated object dimensions. In FIG. 16B, on the other hand, the lenslet clear apertures 306 are approximately equal to the RGB pixelated dimensions; and in FIG. 16C, the lenslet clear aperture 308 is greater than the pixelated object dimensions.

FIG. 17A illustrates an array of lenslets 310 where each of the lenslets has an equal, though non-overlapping FOV 312. Note that in such a case, where little or no FOV overlap occurs, a defective lenslet 310 would result in losing some of the image. However, in the case of FOV overlap 314, such as shown in FIG. 17B, the loss of a single lenslet through defect has a lesser impact on overall image quality since adjacent lenslets 316 transmit some—or all—of the image covered by the defective lenslet.

Figure 18:
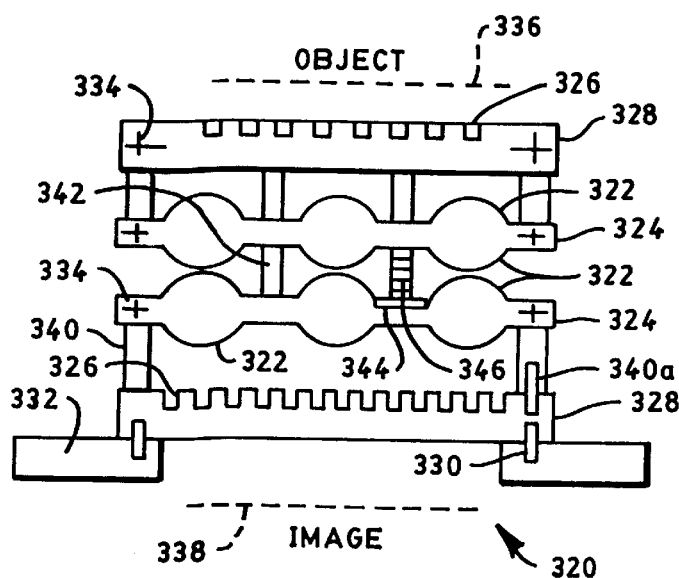
FIG. 18 shows a cut-away side view of a stack assembly constructed according to the invention and including spacers, fiducials, assembly pins, opaque stops at the interstitial spacing, and associated items.

Stacks constructed according to the invention generally include, at least, four lenslet array surfaces formed with at least two substrate elements. Assembly can include discrete air-spaced elements with external mechanical fixturing and/or mechanical spacers placed between the elements and arrays. Such a stack provides a stable, monolithic structure which easily integrates into a system, device or product. With reference to FIG. 18, a monolithic stack 320 is shown to illustrate the function of fiducial marks, spacers, and interstitial lenslet microalignment features. The stack 320 includes four arrays of refractive lenslets 322 disposed with two substrates 324, and two arrays of diffractive lenslets 326 (diffractive kineform type) disposed with two substrates 328, one of which is drilled and pinned with assembly pins 330 to a mechanical mount 332. Fiducial marks 334 are used to coalign the arrays of lenslets 322, 326 to provide for efficient imaging of the object 336 to the image plane 338. The stack 320 additionally has spacers 340 disposed within the stack so as to provide for proper coregistration and spacing between arrays. The spacers 340 can also be drilled and pinned, such as shown as pin 340a, to a substrate. Note that coalignment and spacing between arrays can also be made directly from the substrate material, as shown by spacing element 342, or by the mask material 344 arranged at interstitial locations between lenslets 322, such as shown by spacing element 346.

Figure 19:
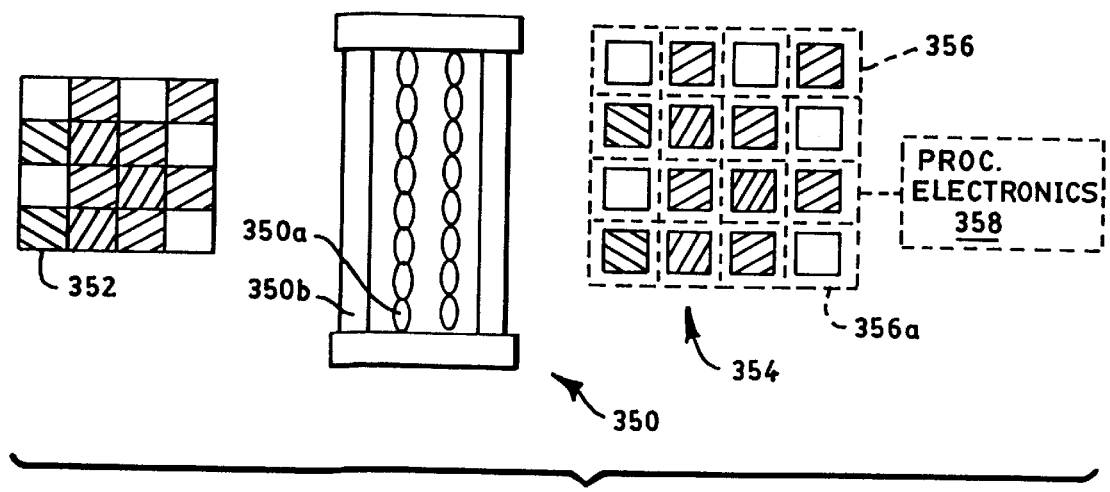
FIG. 19 illustrates a Hartman Transform encoder constructed according to the invention.

FIG. 19 illustrates a Hartman Transform Encoder 350 constructed according to the invention. The encoder 350 divides the optical wavefront (or object space) into discrete parts for individual imaging and analysis. That is, it takes a continuous image 352 and breaks it into a set of discrete pixels 354, each of which is independently evaluated. Accordingly, the SAM 350 (including two non-refractive lenslet arrays 350a and two refractive lenslet arrays 350b) of FIG. 19 images a checkerboard object 352 into a corresponding image 354 which can be conveniently coincident with a photodiode array 356 (here shown by a dotted outline, including detector pixels 356a), and associated electronics 358, so as to process individual image signals separately.

Figure 20:
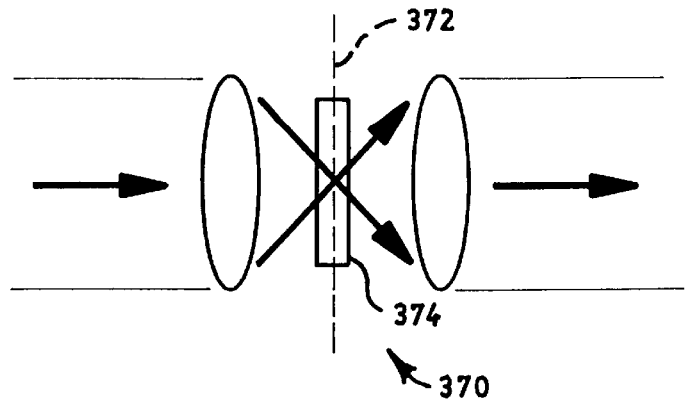
FIG. 20 illustrates optical processing apparatus constructed according to the invention.

As discussed earlier, multi-element SAMs of the invention with one or more intermediate image planes facilitate the insertion of passive or active media at a field image or at a collimated space between two lenslets in the stack. Active media located at the field stop provides a convenient forum from which to accomplish optical processing. Consider, for example, FIG. 20, which represents one channel 370 of a stack and which includes an intermediate image 372. The channel 370 further includes a light modifying element 374. By way of example, the element can be a pupil with a selected transmission function, which in linear systems theory provides a canonical processor: the output transform field is the convolution of the corresponding input with the Fourier inverse of the pupil's transfer function. However, the element 374 can also be an electro-optic modulator, a liquid crystal light valve, an active color filter mosaic, a spatial light modulator, a computer generated hologram, and even gain media to accommodate a wide variety of applications for optical transform systems, compact optical correlators, optical network and computing systems, switching systems and numerous other optical signal processors. Fixed passive spatial filters, color filters, or encryption filters can also be co-located at the image 372 in the stack assembly to create a wide variety of fixed or passive optical signal processing systems. The inclusion of such devices at the internal image provides optical processing of each of the channels, if desired, in a massively paralleled processor.

Figure 21:
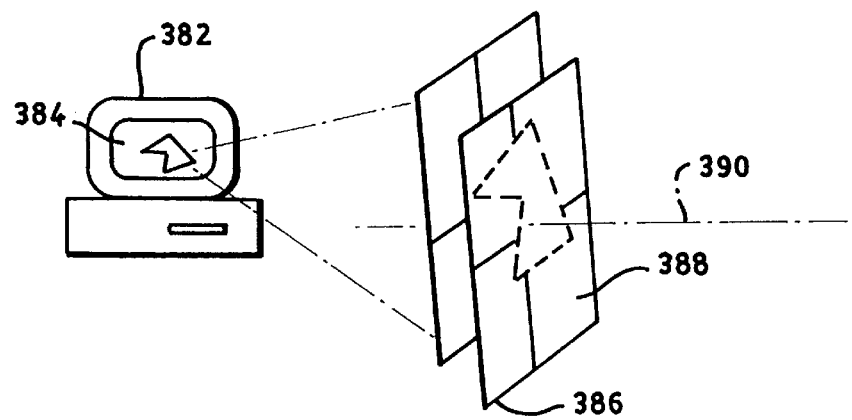
FIG. 21 illustrates a scene generation system constructed according to the invention.

FIG. 21 shows a scene generation apparatus 380 constructed according to the invention. A computer 382 is used to generate a display pattern on a FPD 384 such as the computer display. A tiled stack 386, shown in a perspective view, thereafter images the display 384 as a large format display 388 suitable for a number of uses (note for clarity of illustration that the computer and display are shown parallel to the optical axis 390 while in fact it would be perpendicular to the axis 390 to enable reimaging). By way of example, the apparatus of FIG. 21 is suitable to provide an inexpensive, compact wide FOV display screen 388.

Figure 22:
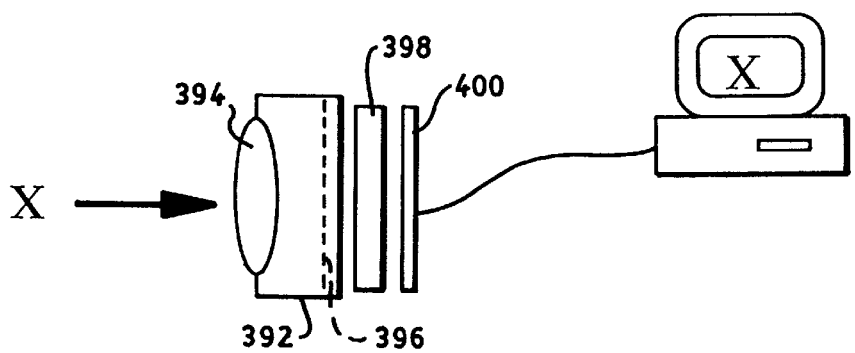
FIG. 22 shows a digital camera constructed according to the invention, including a solid state display and a stack for converting a 35 mm film image to the solid state display.

FIG. 22 shows a side view of a digital camera constructed according to the invention. Briefly, the camera body 392 and optics 394 are constructed by known methods to generate a 35 mm film-formatted image plane 396 (shown by a dotted line internal to the body). In accord with the invention, a stack 398 is configured to fit with the body 392 (depending upon the camera body configuration 392, the stack 398 is internal or external to the body and connected by appropriate mechanical fixturing (not shown)) so as to reimage the image plane 396 onto a solid state device 400, e.g., a CCD. In order to achieve this, the stack 398 magnifies or degmagnifies the image 396 selectively so as to fit the pixelated dimensions of the device 400. In this manner, the scene "X" as viewed by the camera 392/394 is conveniently converted to electrical form for display on a device such as a computer 402.

Figure 23:
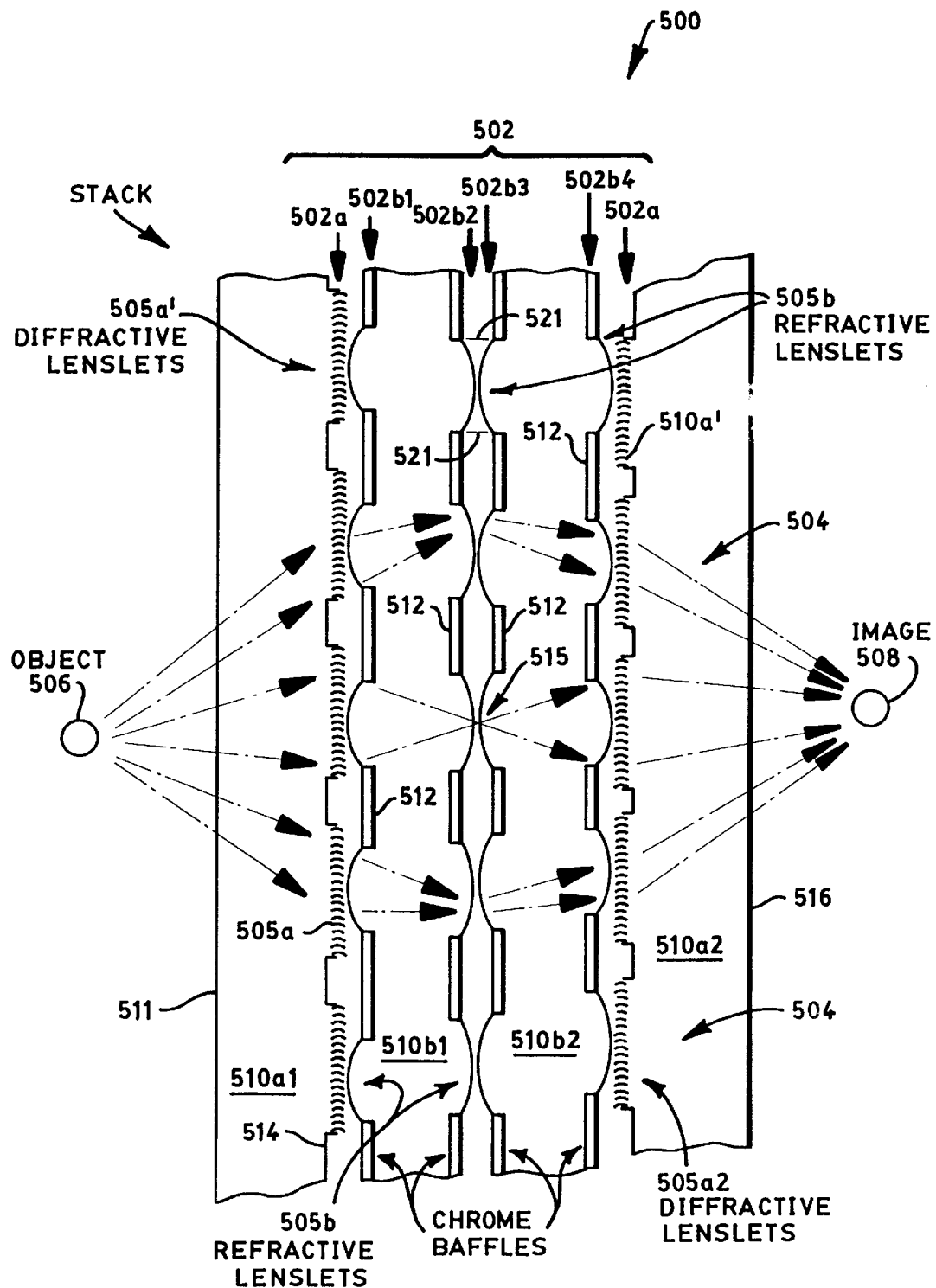
FIG. 23 is a schematic view of a four element stack of the present invention.

FIG. 23 shows a four-element stacked lens array imaging system (SAM) 500 of the invention. The SAM 500 includes a hybrid assembly (i.e., "stack") of lenslet arrays 502, with precise registration among the plurality of individual lenslet optical channels 504 defined by the arrays 502. This allows for optical image transfer from object space 506 to image space 508. The stack 500 assembly of lenslet arrays 502 may perform either magnification or demagnification, depending upon specific applications.

More particularly, FIG. 23 illustrates a stack having four elements or substrates 510. In a preferred embodiment, all substrates are silica. Each substrate is illustratively shown with a constant thickness of about 400 microns, though other thicknesses are possible and envisioned. By way of example, the diffractive element substrates 510a may have a thickness of 1.0 mm while the refractive element substrates 510b may have a thickness of 300 microns. The stack has a total of two arrays 502a of diffractive lenslets 505a and four arrays 502b of refractive lenslets 505b, although this number is purely exemplary. For example, in a large screen display, the stack could comprise three diffractive microlens arrays and three refractive microlens arrays. Regardless, each refractive array has integral inter-element stops 512, such as chrome baffles, in open areas (i.e., interstitial regions) between lenslet channels 504 to form entrance and exit pupils, field stop and baffles for stray light rejection and control of crosstalk. The design of the magnifying microlens array stack 500 utilizes arrays of tilted, off-axis optical channels 504 with respect to the central optical axis between the image 508 and object 506.

The left surface of the first element 510a1 has a planar surface 511 and is adjacent to the object plane 506. The right surface 514 of the first element 510a1 has diffractive lenslets 505a1 that function as aspheric correctors that correct for residual aberration. Both monochromatic aberration and chromatic aberration correction is addressed using diffractive lenslets that provide negative dispersion and which require very little paraxial power to correct for chromatic aberrations.

The middle two elements 510b1, 510b2 in the stack 500 of FIG. 23 have refractive lenslets 505b on each array surface 502b. An inverted field image 515 is formed between the second and third elements. The fourth element substrate 510a2 has a left surface 510a' with a diffractive lenslets 505a2 for purposes similar to the first element 510a1. The right surface 516 of the fourth element 510a2 is planar and is adjacent to the image plane 508. The four elements 510 of the stack may be direct contacted and cemented in place.

The stack of FIG. 23 interlaces the images from each optical channel (defined by sequential lenslets in the arrays) to create the final total uniform image 508. If every channel 504 was parallel, the demagnified image from one channel 504 would not overlap the image from its neighboring channel. In that case, there would be a demagnified image patch corresponding to each channel surrounded by either a region of no light or a mis-interlaced blur. Thus, the lenslets 505 in the array 502 which are nearest to the image 508 have a higher packing density than the others. This 'off-axis" type of design not only allows the individual channels 504 to have demagnification, but it also allows the array of optical channels to converge towards the final demagnified image. From FIG. 23, it can be seen that the refractive and diffractive lenslet arrays 502 form channels 504 from object to image space that bend inward toward the central optic axis.

In a preferred embodiment, the first and last refractive surfaces (left to right) have identical surface figures, while the second and third refractive surfaces (left to right) also have identical surface figures. The lenslet packing configuration is circular apertures on a square Cartesian coordinate array. The clear aperture for the object side is illustratively 10 mm by 10 mm. The overall area for each substrate is illustratively 12.5 mm by 12.5 mm. Overall, the stack 500 illustratively provides for a 60 by 60 array of optical channels 504. FIG. 23 also illustrates the effect of increasing axial tilt of each optical channel path to converge on the image plane.

To simplify fabrication of mask tooling as well as the lenslet arrays, the refractive lenslets (and similarly the diffractive lenslets) within a given array are identical made and uniformly spaced, although this is purely exemplary. By example, the first refractive array 502b1 has lenslets 505b with a diameter of 150 μm and a lens spacing of 161.5 μm. The second refractive array 510b2 has lenslets 505b with a diameter of 120 μm and a lenslet spacing of 158.5 μm. The third refractive array 502b3 has lenslets 505b with a diameter of 120 μm and a lenslet spacing of 157.6 μm. The fourth refractive array 502b4 has lenslets 505b with a diameter of 100 μm and a lenslet spacing of 155.8 μm.

In the alternative, the surface of each lenslet array may contain refractive and/or diffractive kineforms, high order, high efficiency diffractive steering or focusing lenslets, holograms, effective index modulating surface arrays, apodizing or other spatial filters, or other features typically generated by lithographic and semiconductor-type fabrication technology. One or more macroscopic planar or refractive lens surfaces may be incorporated in addition to the lenslet array surfaces. Each element in the stack may be of a finite thickness having two surfaces, wherein each surface may have the various characteristics described herein. One surface is typically the input surface for that element, wherein the other surface is typically the output surface for that element.

As used herein, the term 'hybrid" sometimes refers to a combination of these different types of optical surfaces (e.g., diffractive, refractive, etc.) for the lenslets in each array. Hybridization provides excellent color aberration or other correction for high efficiency, high modulation transfer function and uniformity over a large aperture optical system.

The input and/or output surface of each array provides a clear aperture system with performance at least equivalent to, or greater than, the mechanical aperture of the device. This allows for seamless tiling of the stack optics into an infinitely scaleable, tiled, massive parallel processed array for a very large scale image display or image acquisition over a large field of view. Microelectronics-type fabrication of tiled structures allows for cost-effective manufacturing of large scale assemblies. For example, a single photomask may be used in conventional microlithography and VLSI manufacturing processes to generate the diffractive and refractive lenslet arrays. Massive parallel processing of discrete tile subassemblies allows for cost effective computer control of large scale, seamless tile array systems at very high speeds for real-time video rate (or faster) processing.

The system 500 reimages a discrete pixelated object space 506 into a discrete array image space, or reimages a continuous object 506 into a continuous image 508, without dark spaces, gaps or blurred regions between pixels or local image areas at the image plane. This is accomplished by careful image interlacing of adjacent channels 504 or kernels of channels in the stacked array structure.

Image interlacing of adjacent microlens channels 504 provides a uniform, high efficiency optical tile system with a total optical path length or working distance which scales with size and f-number of the lenslet channels 504. The system 500 therefore provides for a flat panel optical system with a thickness, weight and mass that is much smaller than a conventional macroscopic lens or mirror optical system.

The microlens array element surfaces may consist of a uniform array of lenslets of equal surface figure at regular spacing, or kernels of subarray lenslets of equal surface figure at regular spacing, or uniquely different lenslets at regular, irregular or changing spacing depending upon the location from the mechanical center of the surface.

The individual lenslet apertures may be round, square, hexagonal or other shape. Also, the apertures may be equal to or smaller than the lenslet-to-lenslet center spacing, to leave a non-lensed zone between lenslets.

Either the lenslets 505, lenslet surfaces and/or inter-lenslet spacing (here shown as items 512) may contain hard stops, baffles, masks or opaque zones for control of crosstalk, elimination of stray light, reduction of aberrations, maximization of image contrast, and optimization of modulation transfer function. Intra-element stops 512 or opaque zones may be fabricated by chemical modification of element stops, or opaque zones may be fabricated by chemical modification of element substrate material, trench etching and backfill with opaque materials, thermal or other physical processing. Surface stops may be fabricated using physical deposition, chemical modification, printing or other processes for depositing or locating opaque materials in interstices between lenslets. Inter-element stops 512 or baffles may consist of metal (e.g., chrome) or other opaque masks which can also provide for accurate spacing and precision location of adjacent lenslets in the array.

The design of the stack for stray light control considers four sources of undesirable light. First, it is desirable to block light from the regions between optical channels. Second, it is desirable to eliminate or at least restrict the possibility for light to cross through multiple optical paths and to exit the system at other than designated channels. Third, an antireflection coating is preferably included to eliminate stray light from multiple surface reflections. Fourth, the optical surfaces should have minimal scattering.

The third and fourth sources of stray light are addressable upon fabrication of the optics. The first and second sources of stray light require the design of efficient baffles and hard stops between the lenslets. The source of stray light from regions between the optical channels is restricted by coating the surfaces between lenslets with an opaque coating. The second source of stray light is reduced or eliminated by additional baffling or by encapsulating each optical channel in an opaque cylindrical baffle 521.

One method by which the system 500 accomplishes magnification or demagnification is by outward or inward tilting of selected lenslet optical channels 504. The system 500 may also utilize lenslet array channels to effect magnification or demagnification by outward or inward tilting of channel optical axes. Magnification or demagnification can be divided equally or unequally among elements 510 of the stack. In a preferred embodiment of the stack of FIG. 23, the amplitude of magnification or demagnification is divided equally about the field image 515 between the first and second elements, and the third and fourth elements (left to right).

Individual lenslet sizes may be smaller, equal to, or larger than the object or image space pixel dimension. Larger lenslets 505 will encompass fields of view over many pixels in object or image space, or a field which exceeds the aperture of the lenslet with potential overlap among the fields of view of multiple lenslet channels. Lenslets of equal aperture size to field of view in object space 506 may transfer the image of many or just one pixel or field of view equal to the lenslet aperture. Lenslets 505 of smaller aperture size may utilize or interlace the images of many lenslets to image one point in object space to a point in image space.

Lenslets which have an aperture size equal to field of view is the least preferred configuration due to the extremely tight tolerance required in fabrication, registration and low defect density needed for good uniformity of image transfer. Designs with the larger lenslet apertures require simpler masks for fabrication with fewer features; but very low defect density can be tolerated unless multiple lenslet channels are used to image a single point in object space. On the other hand, more complicated masks for fabrication are required for lowest packing fraction for optical efficiency, but allow for the greatest tolerance in registration and defect density due to the interlacing of images from many channels to image a point in object space into image space.

In one embodiment, approximately five channels transmit light simultaneously from each point in object space to image space. That is, a single point in object space radiates into five adjacent channels in a square pack geometry. Thus, if a lenslet channel has a defect, the information in object space is not lost. Instead, it is transformed by surrounding lenslet channels, but with a fractional loss of intensity. In one embodiment, the resulting field of view for a lenslet in object space is 11.86 degrees or 168 µm. This imaging of a single point source of light through more than one optical channel increases optical throughput, achieves appropriate image interlacing and maximizes imaging reliability. The illustrated f-number of each lenslet channel 504 at design conjugates is f/6.33, while the resulting effective f-number of the stack is approximately f/3.9. Note that a hexagonal close packed arrangement of lenslet arrays could reduce the effective f-number further.

The system can provide either inverted or erect-images at the image plane 508 output. Systems with erect images require an odd number (1, 3, 5, . . . or 2n+1, where n is an integer number) of field stops or intermediate field image surfaces internal to the stack structure. The simplest configuration has one intermediate image plane 515 where a field stop or field lenslet can be positioned. Systems with inverted image output have zero or an even number of field stops or field image surfaces internal to the stack structure.

Systems with internal field images may incorporate field stops in the form of micro-machined, electroformed, molded or other aperture plates for aberration control, improvement of image quality or modulation transfer function.

Generally, the minimum requirement contemplated for the imaging system of this embodiment is four array surfaces and two elements. The stack of elements can be assembled as discrete, air-spaced elements with external mechanical fixturing or an internal mechanical spacer. Assembly using an internal mechanical spacer can provide for a stable, monolithic structure for easy integration into a system or product.

The element surfaces and/or spacers may include fiducial marks to facilitate micron-level registration and location of components. These fiducial marks can be deposited, or male or female patterns can be etched into surfaces at interstices between microlens elements. The opposing surface of the next element, or the spacer between elements, can also have fiducial marks or mating surface relief patterns to facilitate assembly or co-location of elements and components of the stack assembly. Otherwise, the lenslet apertures can register into one or more mask plates between adjacent elements of the stack to provide for co-location and precise positioning in x-, y- and z-axes of the stack assembly.

Monolithic, self-alignment construction of stack assemblies allows for compact, high-performance optical systems with superior structural and environmental integrity, in comparison to conventional optical systems. The system optics can be assembled with buried and cemented surfaces for added reliability and impermeability to contamination or dirt.

An intermediate image plane affords the opportunity to design in passive or active media at a field image or collimated space between two arrays in the stack. Optical wavefronts or images can thus be demagnified equally or nonu-niformly between input array(s) to the field space and output array(s) to the object space, Active media such as electro-optic modulators, liquid crystal light valves, active color filter mosaics, other spatial light modulators, computer generated holograms, non-linear optical or linear optical, and even gain media, co-located at a field stop accommodate a wide variety of applications for optical transform systems, compact optical correlators, optical network and computing systems, switching systems, and numerous other optical signal processors. Fixed passive spatial filters, color filters, or encryption filters can also be co-located at a field image in the stack assembly to create a wide variety of fixed or passive optical signal processing systems. The compact, monolithic nature of the stack assembly allows for ease of assembly and integration with internal devices plus associated electronics and mechanical fixturing in many applications.

The stack components and assemblies of FIG. 23 may be fabricated using a wide variety of materials and methods compatible with volume microelectronics assembly, tooling and equipment. Substrates 510 can be semiconductor, glass, single crystal, polycrystalline, liquid crystal, polymer or other optically transmissive material amenable to processing into microlens arrays. In a preferred embodiment, the hybrid diffractive/refractive optics are fabricated in optical grade polymer using precision replication and molding techniques for minimum thickness, low weight and low cost. Metal or other solid negative masters can be used for mold fabrication of array elements and stacks. Array elements can be cemented to bury surfaces for added reliability. Spacers between elements can be glass, metal, polymer, crystalline or other appropriate structural or optically opaque medium to allow for registration, and for other optical and mechanical properties. Active and passive devices located between elements, particularly at field image planes, may incorporate electronics and mechanics for assembly and fixturing of system products.

The system technology can apply to applications across the optical spectrum, from deep ultraviolet to the far infrared. Indeed, many semiconductor materials with ease of processing using microelectronics fabrication technology have excellent infrared transmission properties for novel infrared applications. The compact, flat panel nature of the system of the present invention allows for easy integration with an image plane device such as a focal plane array detector. The system optics can also function as an optical signal processing window that isolates and protects the focal plane array device in a controlled environment atmosphere such as cryogenic or other thermally-controlled environment (e.g., heated, isothermal, non-cryogenicically cooled). In addition to environmental protection, use of an active attenuator or filter can afford protection from intense light or unwanted spectral components.

The system optics of FIG. 23 thus provide a singular optical assembly in imaging, display or detection applications using a single flat panel display, focal plane array, or other direct display device or detector device. The ability to fabricate system optics with zero edge or clear aperture to the mechanical edge of the output or input surface allows for infinitely scaleable tiling of massive parallel processed arrays for very large flat panel displays or very wide area, high resolution image acquisition systems.

Figure 24:
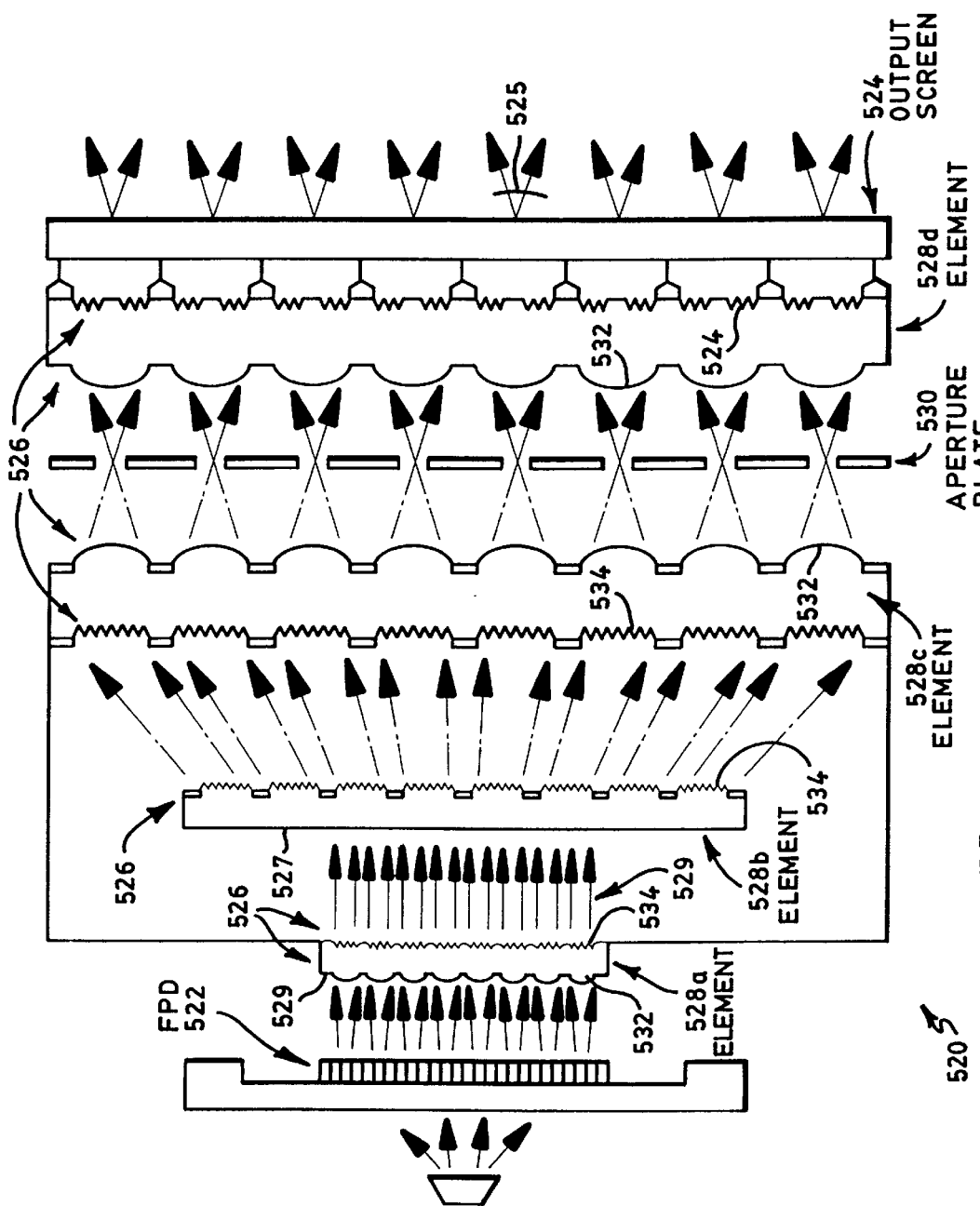
FIG. 24 is a schematic view of a four element stack similar to that of FIG. 23, incorporated into an embodiment for magnification of light emitted from a miniature flat panel display, in accord with the invention.

Referring now to FIG. 24 (which is a subcomponent to the system embodiment of FIG. 25), there illustrated is an embodiment of the optical imaging system 520 of the present invention operable in a magnification mode. The system 520 is used to reimage and magnify the pixelated object display 522 from a miniature FPD to a larger image plane 524. Such miniature electronic displays exploit microelectronics manufacturing technology to produce high resolution, active matrix displays at high yields and low costs. Then, assembly of the hybrid diffractive/refractive microlens array magnifier to a miniature FPD effects a large visible field 525 with a high fill factor in a low weight, low profile, high performance package. The result is a viable, scaleable process for economical fabrication of large size passive or active matrix flat panel electronic displays with high efficiency, high resolution and high contrast, but with low profile and low weight for numerous military and commercial applications.

FIG. 24 also shows seven lenslet arrays 526 on four substrates 528, and an array of stops configured on a common aperture plate 530. The arrays 526 include either refractive lenslets 532 or diffractive lenslets 534.

Figure 25:
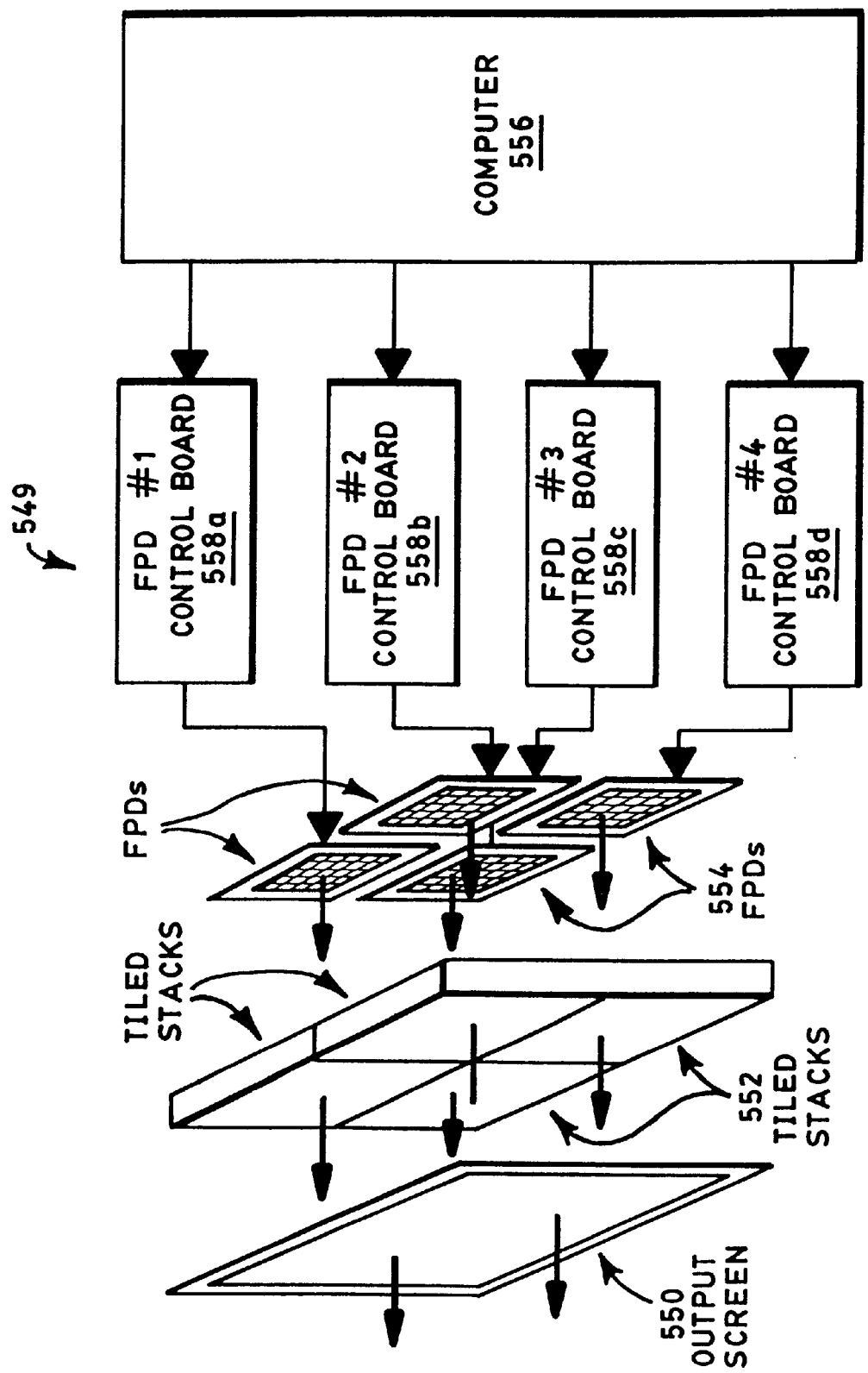
FIG. 25 is a schematic diagram of the system of FIG. 24 incorporated into a computer-controlled, multi-stack embodiment of the invention.

The stack 520 of FIG. 24 is easily integrated into a system such as shown in FIG. 25. As seen in FIG. 25, the output screen 550 of system 549 can be a plurality of tiles 552 that provide the resulting ultra-large flat panel display. Such a display 550 finds common informational display usage in sports stadium and arena scoreboards, high definition television, outdoor advertising, airport runways, entertainment and gaming, virtual environments, virtual conferences, conventions, and countless other areas. The display 550 is a large screen, computer driven, adaptive, active matrix flat panel display with high uniformity of luminance over a wide field angle. The process of tiling a matrix of repetitive stack elements, e.g., a stack 520 of FIG. 24, is thus an extremely powerful concept for creating large scale images in a cost effective and reliable manner.

The display 550 has utility in areas and markets where well-known and relatively old projection displays will not work or are not appropriate, such as within harsh environments. In extreme environments, a large monolithic FPD 554 often fails, or the image is distorted, due to the extreme temperature range that the FPD 554 is typically exposed to. In contrast, the imaging system 549 isolates and insulates the FPD 554 from the environment. Its structure allows the opportunity to build in a compact heater/cooler to maintain uniformity of FPD performance for all ambient conditions.

As another example, conventional avionics displays often suffer from low contrast in direct sunlight. However, the imaging system of the present invention provides a narrower direct field of view to the pilot. The transreflectance surface of the optics reflects and diffuses sunlight for high contrast. The optics of the imaging system also provides for high brightness and contrast at all practical ambient light conditions.

With regard to very large electronic message displays like those used in sports stadiums and arenas, these displays suffer from inherent high cost, poor performance, excessive weight and structural problems, enormous power consumption, poor reliability and difficulty and large maintenance expense. In contrast, the ultra-large, high resolution display 550 of the FIG. 25 embodiment provides for a seamless, scaleable tile construction. It has all-weather outdoor and indoor direct view capability with a variety of virtual and adaptive screen features.

FIG. 25 also shows a computer 556 coupled to FPD boards 558a–d, which serve to drive each of the respective FPDs 554 in the tile.

With further reference to FIG. 24, the first element 528a in the stack has a left surface 529 that comprises an array of refractive lenslets 532 that receive light from the miniature FPD 522. The FPD may be a color array comprising light sources of the three primary colors to achieve a polychromatic display. Color displays are achieved using a kernel format of discrete red, green and blue pixels in a matrix array format in which the colors are repetitively interleaved by alternating rows or columns of a discrete color. The discrete pixel nature of FPDs allows for independent address of individual pixels or multiplexed kernels of pixels. The discrete pixel structure and electronic address capability of FPDs to create images are appropriate for microlens arrays with discrete lenses precisely registered to discrete FPD pixels. Further, the limited wavelength bandwidth of monochrome or polychrome FPD pixels has the advantage of placing limited wavelength dispersion correction constraints on the design of individual lenslets in the arrays. It also allows for blaze angle optimization of diffraction efficiency for optical transfer from the input FPD image plane 522 (i.e., the object plane of the lenslet) to the output image plane of the lenslet array.

Furthermore, the microelectronic fabrication of the FPD array structure according to the invention provides for reliable registration and aperture definition of FPD pixels, and provides fiducial registration marks for alignment of individual lenslets and the overall lenslet array to the FPD pixel array.

The refractive optics of the left surface of the first element 528a isolate and collimate the light from the FPD 522, and presents the light to the right surface of the second element 528b, which comprises an array of diffractive microlenslets 534. The first element 528a achieves spatial control of the optical emission from the FPD 522 and provides an intermediate image plane (not shown) which can be more effectively transformed by the second element 528b in the stack. The intermediate image plane is needed because oftentimes miniature FPDs have unique optical characteristics that are not necessarily well-suited for efficient optical transfer by a lenslet array.

Although not shown, an aperture plate could be placed to the left of the first surface of the first element 528a, possibly located at the Talbot plane of the FPD 522, to define and isolate individual FPD pixels for the left refractive surface of the first element. The two array surfaces of the first element 528a correct for the color bandpass of the associated pixel, and transform the FPD object plane 522 into infinite conjugates for efficient optical processing by the second element 528b in the stack.

The second element 528b in the stack is a diffractive microlens 534 array at the right surface, with a planar left surface 527. The lenslet array comprises a plurality of sequential diffractive optical elements 534 that provide for two dimensional successive incremental angular displacement ("fanout") and, therefore, magnification of the collimated light 529. In a preferred embodiment, the element 528b may achieve four or five times magnification. The fanout grating array is blazed for the appropriate color. The exact incremental angle of the sequential fanout may be between three and fifteen arc-minutes to effect a five times or greater magnification with an aspect ratio of less than one to one.

The third element 528c in the stack has a diffractive lenslet array 534 on its left surface, and a refractive microlens array 532 on its right surface. The third element 528c spatially redirects (i.e., re-collimates) the now-expanded light emanating from the second element 528b to near 100% fill factor.

The fourth and final element 528d in the stack has a refractive lenslet array 532 on its left surface, and a diffractive microlens array 534 on its right surface. The fourth element 528d serves as the output lens array and may be designed to limit the output field of view, or to effect trans-reflectance optics or other optical transform for contrast enhancement. For example, the fourth element 528d may utilize an additional fanout grating for efficiently modifying the angular field of view for specific angle or wide angle viewing.

Each element 528 in the stack may incorporate fiducial registration marks for precise and accurate tolerancing or the overall assembly, as well as registration of the stack to the FPD 522. For example, if the stack is fabricated as a registered stack of air-spaced refractive and diffractive arrays, each stack layer or element is provided with fiducial registration marks to aid in alignment. Simple black nylon or anodized aluminum spacers may be used for precise dimensioning of the air gap of the stack layers. It may also be possible to incorporate etched relief areas and/or thru-holes to aid in registration.

In operation, the optical imaging and magnifying system of FIGS. 24 and 25 refracts and diffracts the light from each uniformly spaced pixel in the smaller source array of the FPD. It does so at specifically designed varying angles from the normal to produce a larger tile of discrete sampled array, but with constant magnification, contrast and luminance across the surface.

The imaging system of the invention need not be monolithic in construction, but may instead consist of a hybrid stack of optical arrays appropriately registered to each other in the form of a stacked array magnifier (SAM).

Further, to control stray light and enhance contrast, a spatial filter or image transfer array may be utilized between the solid state emitter array 522 (i.e., the FPD or LCD) and the magnifier array. Also, it is not necessary that the output display side optics 524 of the system have a 100% fill factor. However, a 100% fill factor to the edge of the output plane provides for seamless tiling of SAM-coupled FPDs to effect scaleable, large format displays limited in size only by the parallel processing computing capability for control and synchronization of the tile elements.

It is also not necessary that the stack's pixel format have a square appearance. The output display side 524 of the system is not restricted from including a technical screen or optical array for purposes of enhanced uniformity and field of view.

Figure 26:
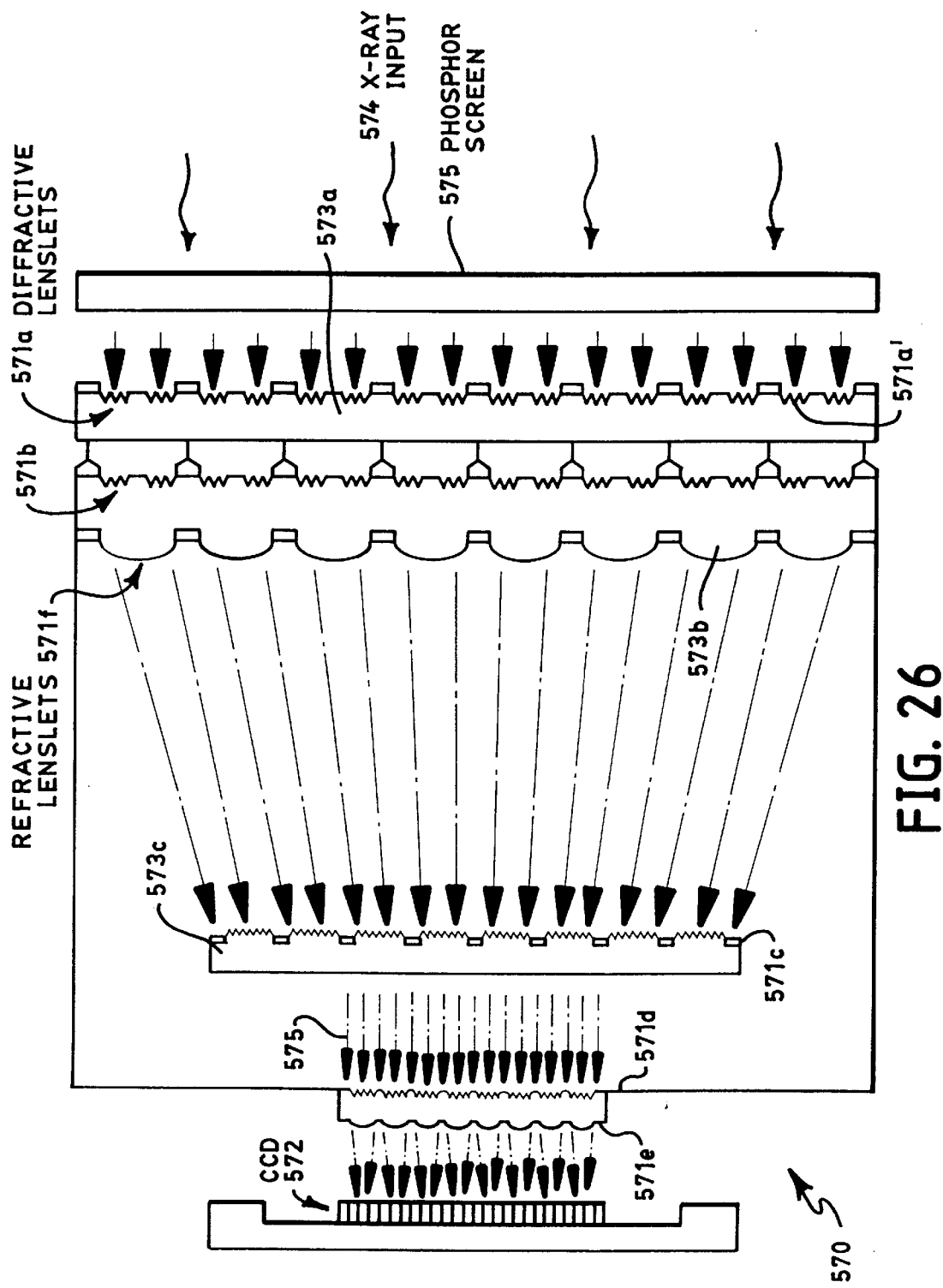
FIG. 26 is a schematic view of a four element stack, similar to that of FIG. 23 and FIG. 24, incorporated into an embodiment of the invention for demagnification of X-rays to a charge coupled device.

Referring now to FIGS. 26 and 27, there illustrated is the optical imaging stack 570, FIG. 26, which is used in a large area, flat panel, X-ray reimager system 580, FIG. 27. In this embodiment, the system 570 is functioning as a demagnifier. Prior art systems suffer from high cost, poor performance, excessive weight and structural problems, along with slow response, high power consumption, poor reliability and difficulty and high cost to maintain.

In contrast, the system 580 provides for a seamless, scaleable tile construction with a discrete, low cost CCD readouts 582 integrated by a parallel process computers 584. The system 580 of this embodiment is not limited to usage with an X-ray input 586; instead, this embodiment has applications in image intensifiers, very wide field of view and wide azimuth elevation fire control and surveillance systems, diagnostic imaging systems for non-destructive testing and medical applications such as real-time whole body imaging for managed response and trauma treatment.

The stack 570 of this embodiment is somewhat similar to that described hereinbefore (FIG. 24) with respect to the ultra-large flat panel display embodiment. The first, second, fourth and fifth arrays 571a, 571b, 571c, 571d are diffractive lenslet arrays which function as kinematic lenslets and low f-number diffractive encoders field lenses to collect and bend light to the first stack refractive lenslet array 571e for focusing onto a CCD array detector assembly 572.

X-rays 574 input from a source, such as from medical equipment, pass through a phosphor screen 575 to the first element 573a in the stack (right to left). The right surface of this element 573a is a diffractive array 571a, while the left surface is planar. The function of the first element 573a is to collect photons and collimate the X-ray input.

The collimated rays then pass through to the second element 573b in the stack. The right surface of this element 573b is a diffractive lenslet array 571b, while the left surface is a refractive lenslet array 571f. The bent rays emanating from this second element 573b are then directed toward the third element 573c in the stack. This element 573c has a fanout grating and includes a diffractive array 571c. Finally, the collimated rays 575 leaving the third element 573c pass through to the fourth element 573d, which is a refractive/diffractive lens array 571d. The rays are then directed to a CCD 572. In one embodiment, each CCD array camera 572 in image space has square pixels at a pitch of 25 µm, in at least a 512×512 array measuring 12.7 mm square. Thus, a desirable input clear aperture size of the first stack is also at least 12.7×12.7 mm square.

FIG. 27 illustrates the further and related embodiment where a plurality (in this case four) stacks are tiled together to receive the X-ray input 586 from a large phosphor screen 587. Also shown are four CCDs 582, and associated electronics that process the electronic signal output, all at the control of an attached computer 604 connected to the PCI bus 600. The electronics include dedicated control boards 584 (controlled by a common external clock 606 and power 608) for each CCD (i.e., a "camera"), along with a frame buffer 588 to capture the data from the control boards 584, an accelerated co-processor 590 to process the video data, and an enhanced display board 592. A hard disk drive 594 may be utilized to store data ultimately displayed on a video display 602.

Several CCD detectors with megapixel spatial resolution are commercially available from, e.g., Kodak, Loral Fairchild, Dalsa, Sony, Thomson CSF, EG&G, and Philips. CCD array cameras are also commercially available. Cameras appropriate for this embodiment range in size from 1K by 1K to 2K by 2K nominal pixel resolution. One embodiment, for example, utilizes a 4K by 4K pixel resolution tiled array imaging system. This could be accomplished, for example, with four 2K by 2K cameras for a two by two matrix array of stack optics and CCD detectors, or sixteen 1K by 1K cameras for a four by four matrix of stack optics and CCD detectors.

The imaging performance of the CCD detectors most likely limits the resolution and performance of a high spatial resolution, array imaging system rather than the stack optics. Although the stack optics will support any CCD pixel size, the demagnification and size of the stack optics should be specific to the CCD chosen. In order for the stack optics to effect the desired integration of the object onto a plurality of detectors without loss of spatial information, the demagnified images of the object should just fill or slightly underfill the CCD active area. If the CCD active area is overfilled by the image from the stack optics, then a final integrated image with poor image interlacing of the object can result. If the demagnified image from the stack optics significantly underfills its corresponding CCD active area, then provision must be made in software to eliminate the imageless perimeter of the CCD active area and appropriately match magnifications of adjacent stack-coupled CCD modules in order to produce a non-distorted image.

Standard mega-pixel CCD camera driver, logic and signal processing electronics typically support only a few frames per second readout for a 1K by 1K format or 1K by 2K format due to clock speed, timing and RAM memory capabilities. Larger format CCD cameras use readout circuitry that handles multiple 1K by 2K or 1K by 1K outputs in parallel. Clock rates are typically 20 Mhz and readout times of 50 ms or more combined with integration times of 50 ms or more provide less than the desired 30 interlaced frame rate objectives.

High speed, DSP-based commercial frame grabbers with extended display boards for video frame rate image representation on PCI or VME bus computers are available. A dedicated Silicon Graphics computer, or 130 Mhz Pentium processor with high resolution 2K by 2K monitor may be utilized. Frame grabber boards which can support up to 2K by 2K CCD cameras are also available. Systems integration combines the multiple frame grabber boards and adaptive software to integrate discrete camera module images into memory for display. The display is limited to a subset of the tiled imaging system image, but pan and scroll control allow positioning of the target section of image space at any place in the image file, including at the intersection among two or more stack-coupled CCD detector modules.

In addition to the above embodiments, the invention contemplates usage of the stacked array imaging system in numerous and varied applications besides those described and illustrated herein. The details of these other applications should be apparent to one of ordinary skill in the art in light of the teachings herein. The applications include: large array imaging systems for heads-up displays; low light level image intensifiers; large area, high resolution display systems; solid-state medical imaging systems for high resolution whole body or thorax cavity in real time; low weight, flat panel cockpit displays or imaging systems for avionics or critical missions; spectral applications from deep UV to far infrared; high performance infrared imaging systems; displays for environmental extremes; ultra-large, high resolution, flat panel electronic wall displays; optical encryption systems for security; and other non-destructive imaging besides X-ray.

Many other applications for displays and imaging systems are also possible, including active systems where the field stop array at the intermediate image plane is replaced by a spatial light modulator, a phase conjugate medium, or other active or non-linear optical material with index matching properties (e.g., a quantum dot array) for wavelength selective applications. The spatial light modulator may be utilized in an application such as a compact optical correlator. Also, for a compact, low light level aid to the visually-impaired, a microchannel plate having a flat glass phosphor screen input and a flat glass phosphor output may be employed.

Further, all of the foregoing has described optics that are totally transmissive. However, a reflective optical device, such as a mirror, may be located at, e.g., an intermediate image plane when it is desired to fold an image of the object back onto itself. In such an application, it may be necessary to utilize a beam splitter in front of the mirror.

Appendix A contains, for disclosure purposes, experimental data and results conducted with respect to the teachings of the invention. Appendix B contains another exemplary application of the teachings of the invention including a design for a "chip on the tip" endoscope system. Appendix C contains another exemplary application of the teachings of the invention including a design to transform a 512×512 FPD to a 50 mm by 50 mm format. Appendix D contains a listing of other applications, features and benefits of the invention. Appendix E contains another exemplary application of the teachings of the invention including a design for a large area flat panel x-ray imaging system. Appendix F contains another exemplary application of the teachings of the invention including a design for a magnification and demagnification such as for an x-ray imaging module, a compact optical correlator, and a flat panel display tile. Appendix G contains another exemplary application of the teachings of the invention including a design for a discrete pixel array magnifier.

Those skilled in the art should appreciate that changes can be made within the description above without departing from the scope of the invention. For example, different lenslet array configurations, materials, and applications are easily made and envisioned.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. In a method of manufacturing a microlenslet array of the type having a plurality of lenslets formed within a optical substrate having a first planar surface, a second planar surface, and a normal vector that is substantially perpendicular to each surface, the improvement comprising the steps of forming a first lenslet array within the first surface, forming a second lenslet array within the second surface, forming a plurality of lenslet channels between the lenslet arrays wherein each channel includes one lenslet from each of the arrays, the lenslet channels between at least two adjacent arrays having a channel axis vector relative to the normal vector such that the cross product between the channel axis vector and the optical axis vector is greater for lenslet channels further away from a line extending along a center of the substrate and parallel to the normal vector.

2. In a method according to claim 1, a further improvement wherein the step of forming a plurality of lenslet comprises the step of forming lenslets selected from the group of diffractive lenslets, holographic lenslets, phase modulating lenslets, index modulating lenslets, and refractive lenslets.

3. A method of manufacturing a microlens stack having an optical magnification for producing an image of an object along an optical axis, comprising the steps of: combining at least two refractive lenslet arrays with at least one diffractive lenslet array to form a lenslet array stack with a plurality of lenslet channels, each of the channels having a sloped axis between at least two of the arrays, and arranging the channels such that the cross product between the sloped axis and the optical axis is greater for lenslet channels further from the optical axis as compared to lenslet channels closer to the optical axis, thereby achieving the magnification selectively.

4. A method according to claim 3, further comprising the step of arranging the channels such that at least two channels contribute to the image of each point of the object.

5. A method according to claim 3, further comprising the step of arranging at least one array so as to produce an intermediate image of the object and between other arrays, and further comprising a field stop located at the intermediate image so as to reduce the field of view of at least one channel.

6. A method of manufacturing a scaleable large screen display from an electronic display of the type having a center and a substantially planar surface with a surface normal perpendicular to the surface, the display of the type selected from the group consisting essentially of an LCD display, a cathode ray tube, and one or more laser diodes, comprising:
    selecting a desired magnification of the display;
    forming a tiled array of stacked lenslet arrays, the tiled array corresponding to magnification of the display, the stacked arrays within each tiled array operating in concert with every other stacked array within the tiled array so as to operate substantially as a single lenslet array, each stacked lenslet array being formed through the following steps:
        forming at least one array of refractive lenslets into a first optical substrate and at least one other array of non-refractive lenslets into a second optical substrate, the non-refractive lenslets being selected from the group consisting essentially of diffractive lenslets, holographic lenslets, phase modulating lenslets, and index modulating lenslets, arranging the arrays into a stack having a plurality of lenslet channels, each of the channels having at least one refractive lenslet and one non-refractive lenslet, and wherein the step of arranging the arrays includes the step of creating a sloped channel axis between at least two arrays and relative to the surface normal,
    arranging the tiled arrays to operate in concert such that the sloped channel axis is larger for channels further from the center as compared to channels closer to the center wherein the desired magnification of the display is achieved.

7. A method of manufacturing a stack of lenslet arrays for imaging an object to an image, comprising the steps of: forming one or more non-refractive lenslet arrays and one or more refractive lenslet arrays, forming a plurality of lenslet channels and arranging the channels such that each lenslet channel has at least one refractive lenslet and at least one non-refractive lenslet, and arranging the lenslets within a channel to achieve a selected magnification between the object and image.

8. A method according to claim 7, further comprising the step of forming at least one of the arrays through one of (a) molding of an optical grade polymer and (b) coextrusion of an optical polymer, with an opaque polymer.

9. A method according to claim 7, further comprising the step of fabricating the lenslets from a negative relief to generate surface features, plus fiducial marks and mechanical assembly features, the negative relief being fabricated into a metal, ceramic or high temperature composite master.

10. A method according to claim 9, further comprising the step of transferring a positive master in glass, semiconductor or crystal material to a ceramic or elastomer template to form a negative mold master.

11. A method according to claim 7, further comprising the step of forming the arrays from different optical materials so as to correct for optical color aberrations.

12. A method according to claim 7, further comprising the step of manufactured at least two of the arrays through replication, including the steps of fabricating a mold from a negative relief of the refractive and non-refractive lenslets, and of fabricating fiducial and mechanical assembly features within the stack.

13. A method according to claim 12, further comprising the step of fabricating the relief from a metal, ceramic or high temperature composite master which is produced by micromachining or by direct forming into a master mold material.

14. A method according to claim 13, further comprising the steps of coating the master with a release agent followed by one of (a) an epoxy, (b) a polymer, (c) an optical quality organic, and (d) a sol gel material to produce a thin sheet of material with lenslet array features, fiducial marks, and mechanical assembly features.

15. A method according to claim 7, further comprising the step of fabricating opaque interstitial areas to provide for stops and to eliminate or reduce optical crosstalk among nearby lenslet channels.

16. A method according to claim 7, further comprising the step of fabricating the lenslet arrays with fiducial features to facilitate alignment and registration of lenslet array channels in Cartesian x-y and rotational coordinates.

17. A method according to claim 16, further comprising the step of locating the fiducial features at one or more of (a) outside of the lenslet clear aperture and (b) interstial to the lenslet array features.

18. A method according to claim 16, further comprising the step of arranging the fiducial features as one or more of (a) a frame around the lenslet array mask, or parts of the lenslet array mask, (b) within interstitial regions to the lenslet array channels, (c) horizontal or vertical lines, sequences of lines, crossed lines, circles, squares, hexagons, other geometrics or combinations of geometric shapes.

19. A method according to claim 16, further comprising the step of arranging fiducial marks such that a Moire pattern is generated upon assembly of the arrays, thereby indicating proper registration.

20. A method according to claim 16, further comprising the step of making the fiducial marks and assembly features out of material used in the masking of the interstitial and surrounding regions of the lenslets.

21. A method according to claim 16, further comprising the step of making the fiducial marks and assembly features as etched features within the array substrate.

22. A method according to claim 16, further comprising the step of making the fiducial marks and assembly features out of mechanical spacers for placement within the stack.

23. A method according to claim 16, further comprising the step of forming the fiducial marks out of one of a material that transforms from a solid to a liquid when subjected to heat or other activation such that a surface tension is created to promote alignment of the stack.

24. A method according to claim 23, further comprising the step of retransforming the material of the fiducial and assembly features back to a solid, thereby bonding the stack together into a monolithic structure.

25. A method according to claim 23, further comprising the step of assembling the stack with the material at one or more of (a) edges of the stack or (b) internal locations of the stack.

26. A method according to claim 16, further comprising the step of immersing the arrays with adhesive for monolithic bonding of the stack.

27. A method according to claim 16, further comprising the step of adding thru-holes within the stack so as to provide for the insertion of micromechanical pins which assist stack assembly and which mechanically tie the stack into a monolithic structure.

* * * * *